(12) United States Patent
Lindell

(10) Patent No.: US 7,106,246 B1
(45) Date of Patent: Sep. 12, 2006

(54) OSCILLATOR COUPLED TO AN ANTENNA AND AN APPLICATION

(75) Inventor: Kevin W Lindell, 8 Greenfield Dr., Trumbull, CT (US) 06611

(73) Assignee: Kevin W Lindell, Trumbull, CT (US)

(*) Notice: Subject to any disclaimer, the term of this patent is extended or adjusted under 35 U.S.C. 154(b) by 49 days.

(21) Appl. No.: 10/771,944

(22) Filed: Feb. 4, 2004

Related U.S. Application Data

(60) Provisional application No. 60/445,338, filed on Feb. 5, 2003.

(51) Int. Cl.
*G01S 13/74* (2006.01)
*G01S 13/00* (2006.01)

(52) U.S. Cl. .............................. 342/51; 342/42; 342/82; 342/89; 342/175; 342/194

(58) Field of Classification Search ............ 342/29–51, 342/82, 89, 175, 194–197; 375/130–153; 331/172, 173, 174
See application file for complete search history.

(56) References Cited

U.S. PATENT DOCUMENTS

| | | | |
|---|---|---|---|
| 4,274,067 A | 6/1981 | Uzunoglu | |
| 4,355,404 A | 10/1982 | Uzunoglu | |
| 4,356,456 A | 10/1982 | Uzunoglu | |
| 5,453,748 A * | 9/1995 | Lindell | .................. 342/51 |
| 5,603,111 A | 2/1997 | Wyatt | |
| 5,625,327 A | 4/1997 | Carroll | |
| 6,011,439 A | 1/2000 | Colarossi | |
| 6,487,264 B1 | 11/2002 | Alley | |
| 6,529,712 B1 | 3/2003 | Domino | |

OTHER PUBLICATIONS

Sun Jong Kwon Performance Analysis of CDPD Sleep Mode for Power Conservation in Mobile End Systems, IEICE Trans. Commun., vol. E84-B, No. 10 Oct. 2001.
Y. Deval HiperLAN 5.4 GHz Low Power CMOS Synchronous Oscillator 2001 IEEE Radio Frequency Integrated Circuits (RFIC) Symposium, May 20-22, 2001 Pheonix Arizona pp. 53-56.
Y. Deval Low-Power Synchronous Oscillator in SGe Technology for UMTS 2000 Applications Microwave Conference, 2000 Asia Pacific, Dec. 3-6, 2000 Sydney AU pp. 783-787.
Marvin Tam Theoretical Analysis of a Coherent Phase Syncronous Oscillator, IEEE Transactions on Circuits and Syatems, vol. 39, No. 1 Jan. 1992.
Vasil Uzunoglu Synchronous and the Coherent Phase-Locked Synchronous Oscillators, IEEE Transactions on Circuits and Systems, vol. 36, No. 7, Jul. 1989.
Vasil Uzunoglu Some Important Properties of Syncronous Oscillators, Proceedings of the IEEE, vol. 74, No. 3, Mar. 1986.

(Continued)

*Primary Examiner*—Bernarr E. Gregory

(57) ABSTRACT

A radio frequency device has an antenna for capturing an incoming signal for processing by the device or for radiating an outgoing signal from the device and a signal processor having one or more synchronous oscillators responsive to an input signal for providing an amplified output signal without using much power. An application is a radio frequency (RF) transponder (tag) for receiving an RF signal from an interrogator includes a tag antenna for receiving the RF signal from the interrogator and a receiver section connected to the tag antenna wherein the receiver consumes a significantly lower amount of power than conventional receiver technologies by using one or more synchronous oscillators.

45 Claims, 19 Drawing Sheets

OTHER PUBLICATIONS

Vasil Uzunoglu The Syncronous Oscillator: A Synchronization and Tracking Network, IEEE Journal of Solid-State Circuits, vol. SC-20, No. 6, Dec. 1985.

Andre Kesteloot A practical Direct-Sequence Spread-Spectrum UHF Link , QST Magazine, May 1989, pp. 14-21.

* cited by examiner

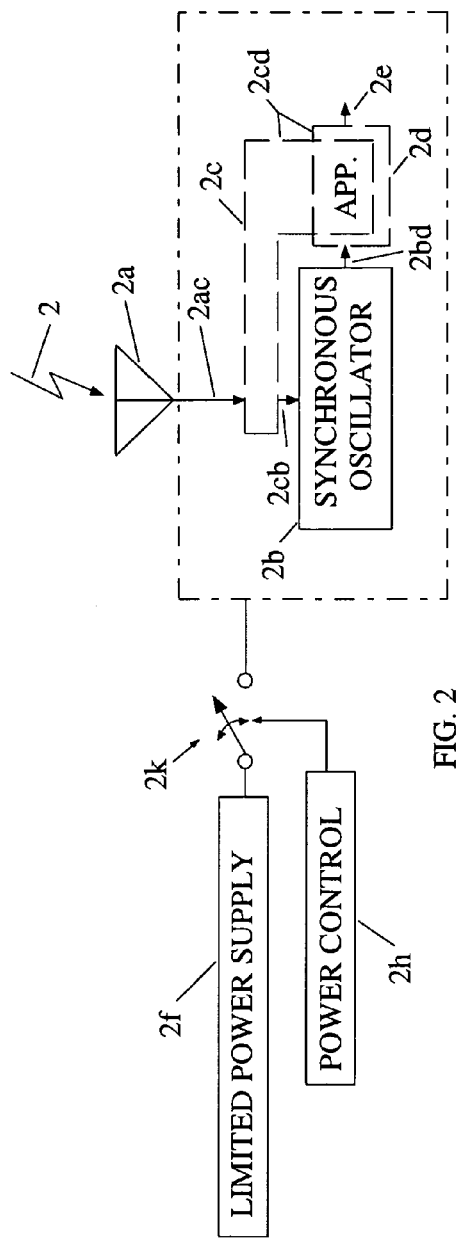
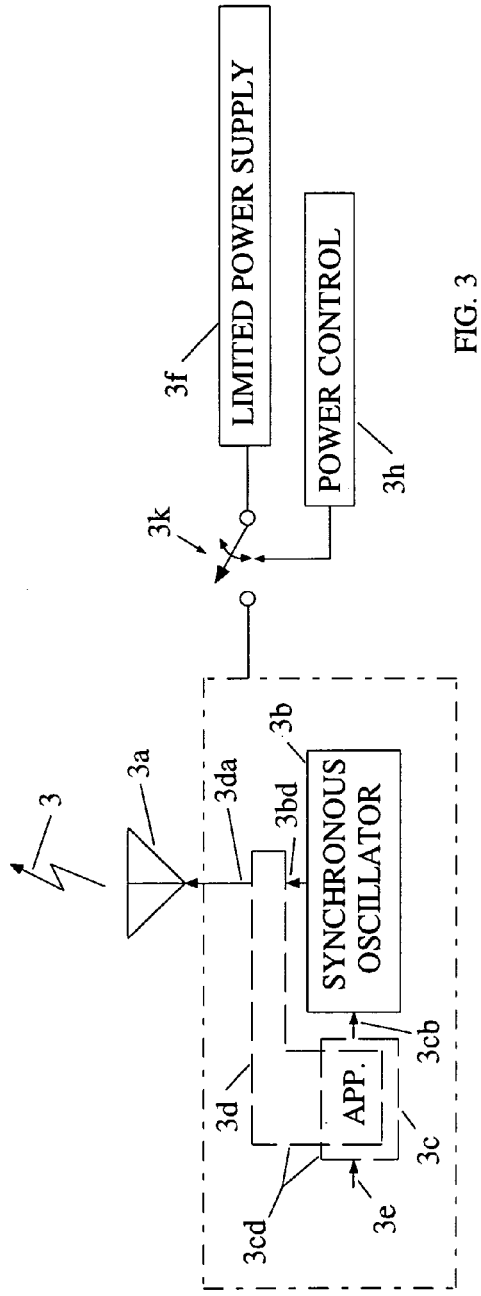

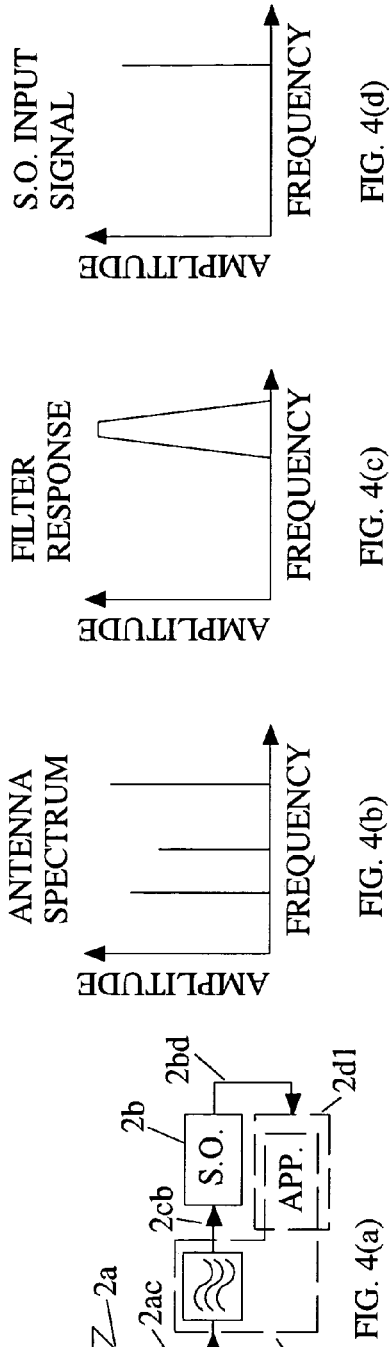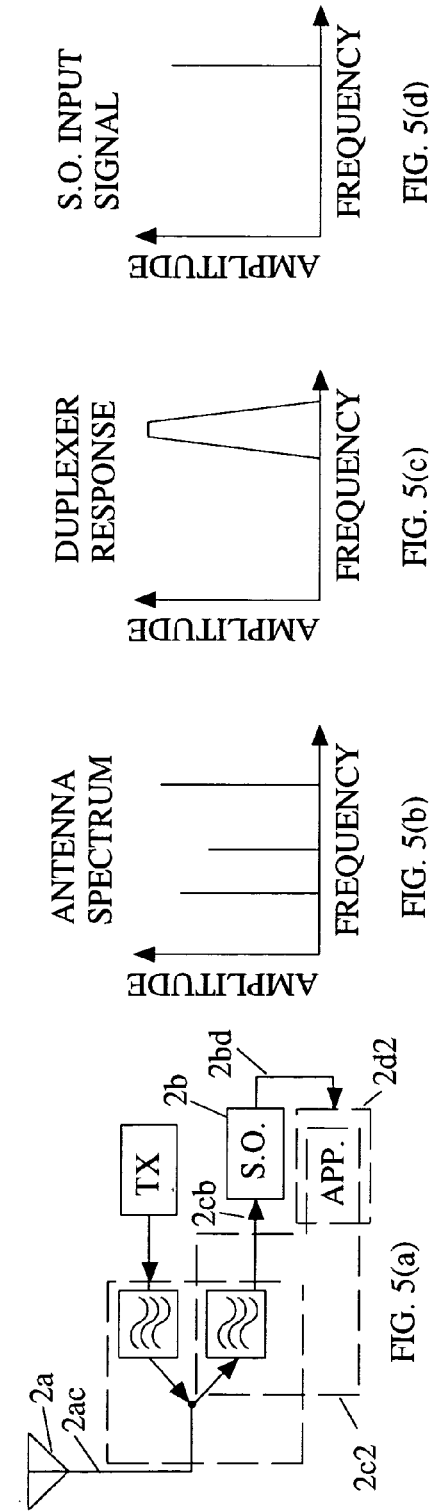

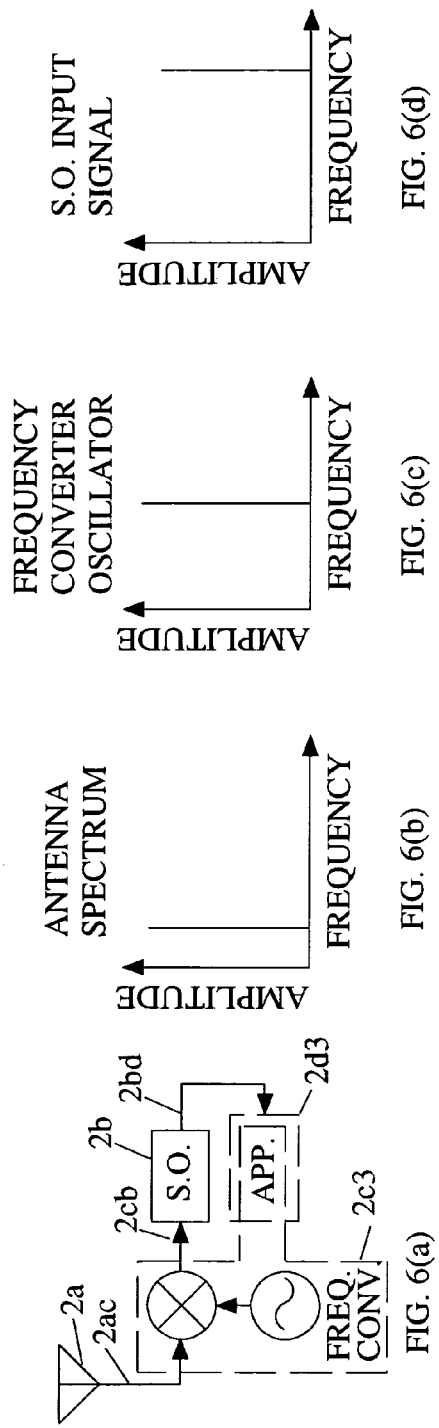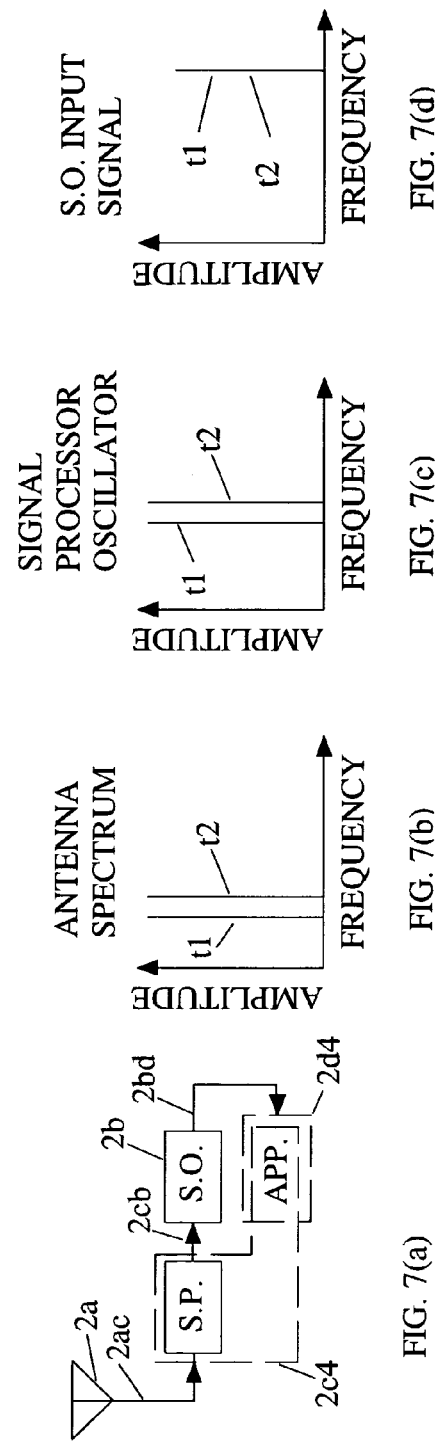

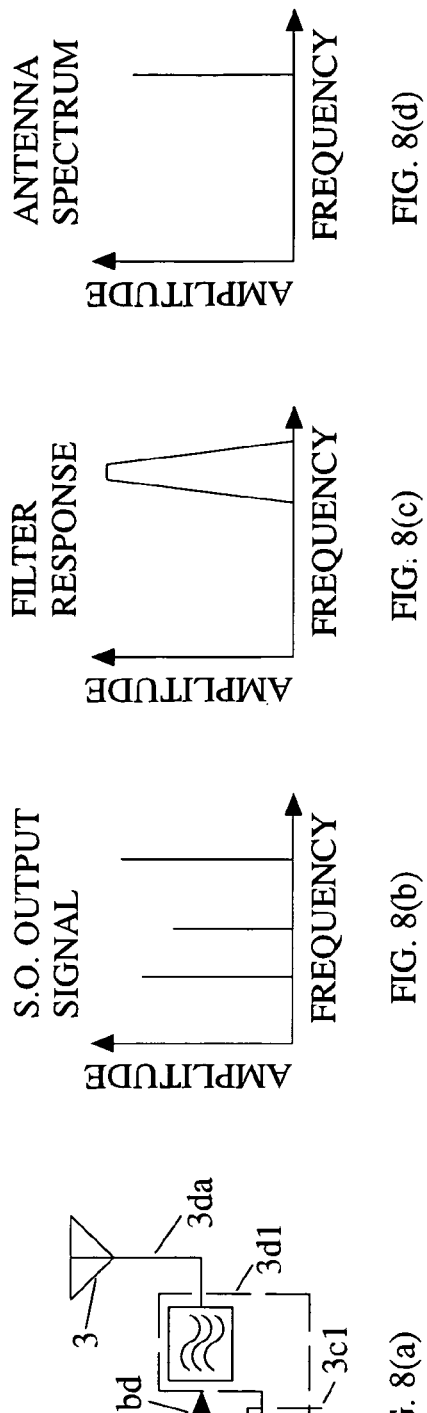
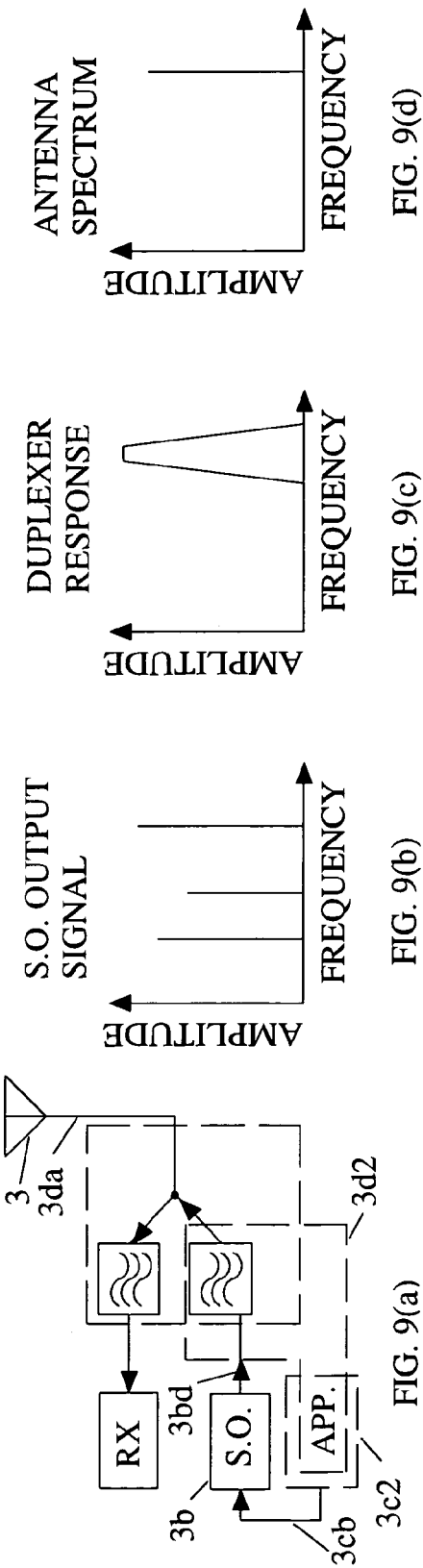

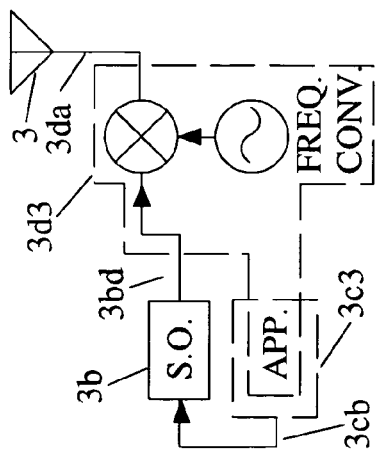
FIG. 10(a)
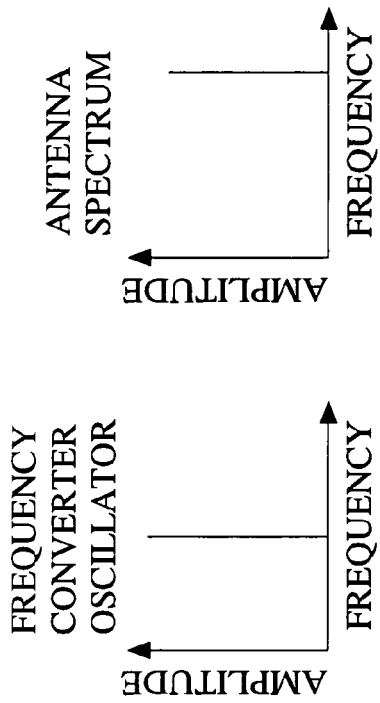
FIG. 10(b)
FIG. 10(c)
FIG. 10(d)
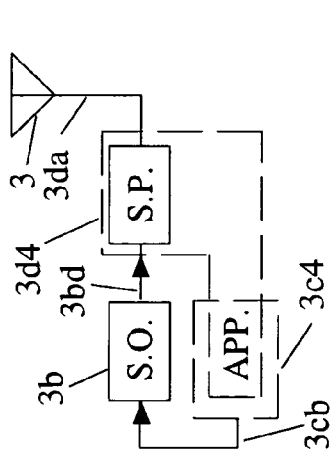
FIG. 11(a)
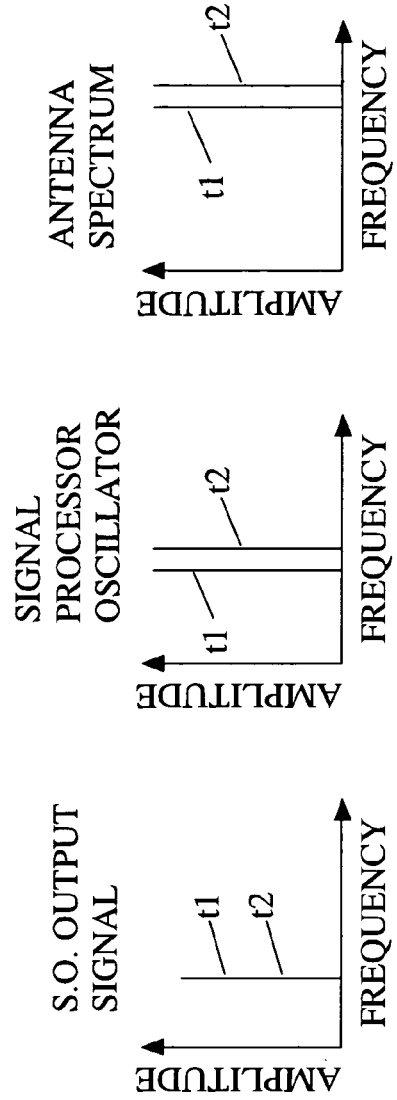
FIG. 11(b)
FIG. 11(c)
FIG. 11(d)

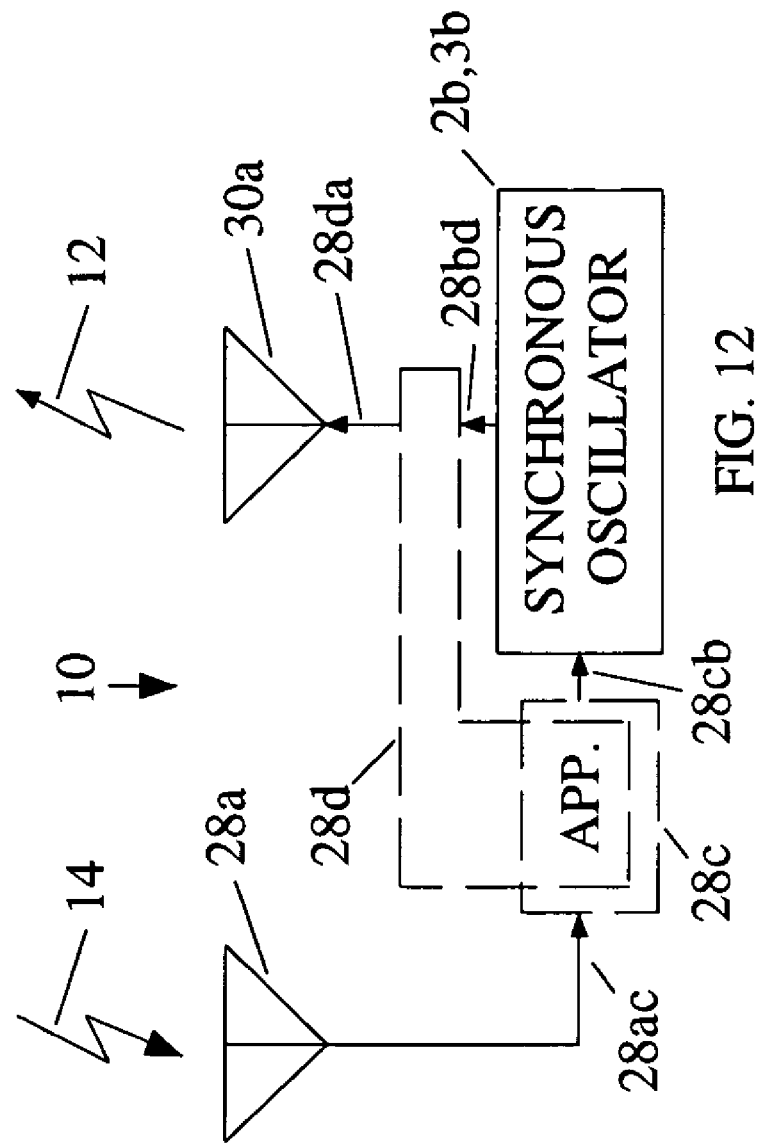

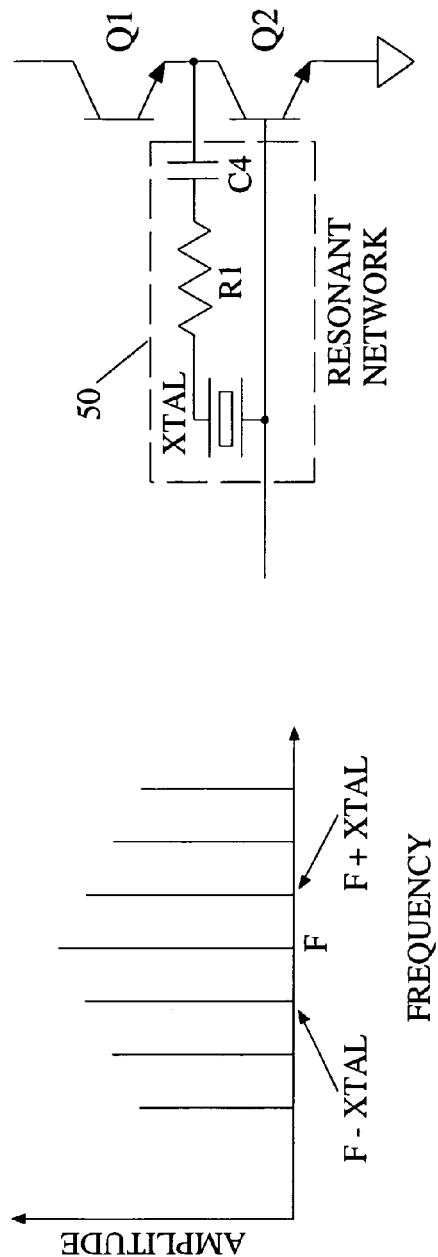
FIG. 18
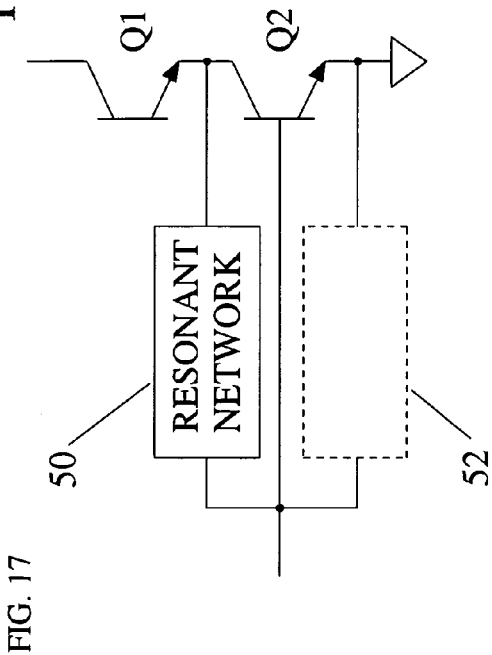
FIG. 19
FIG. 17

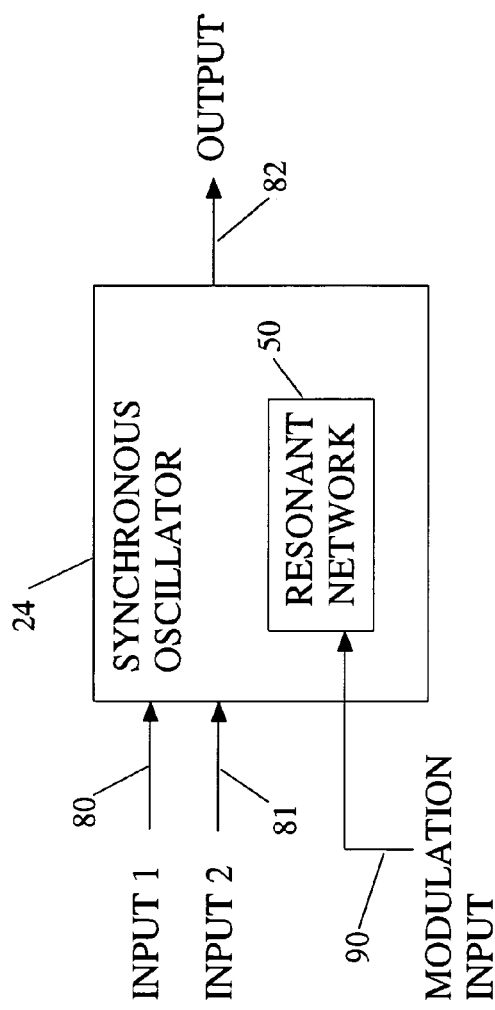
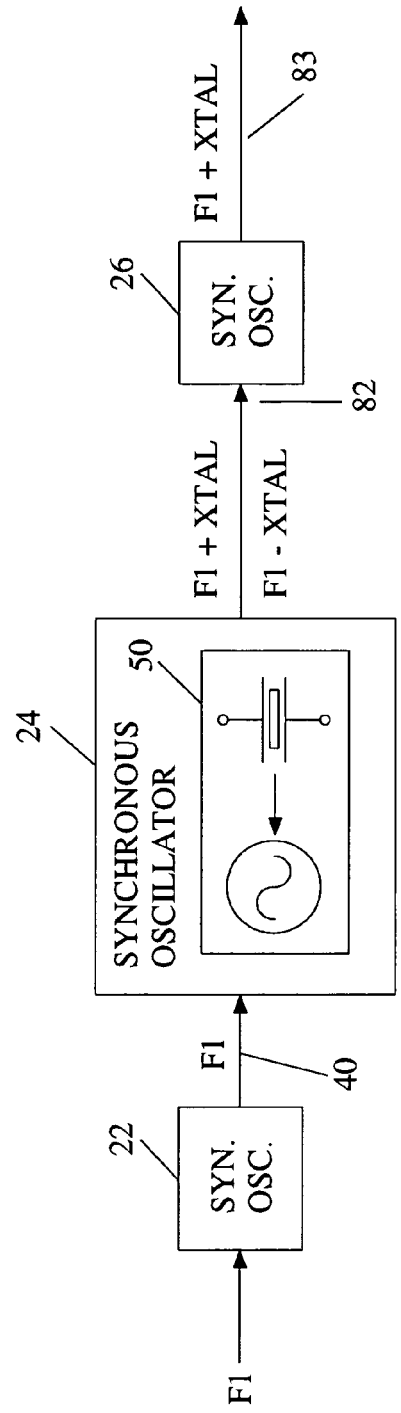
FIG. 20
FIG. 21

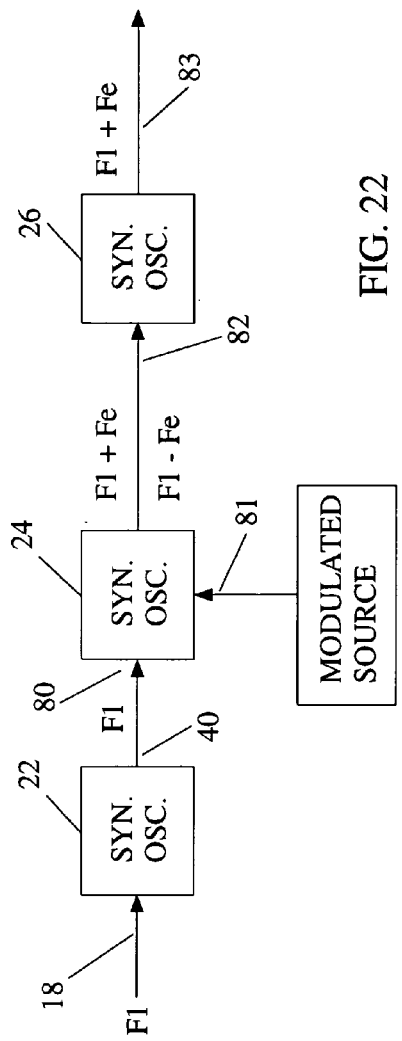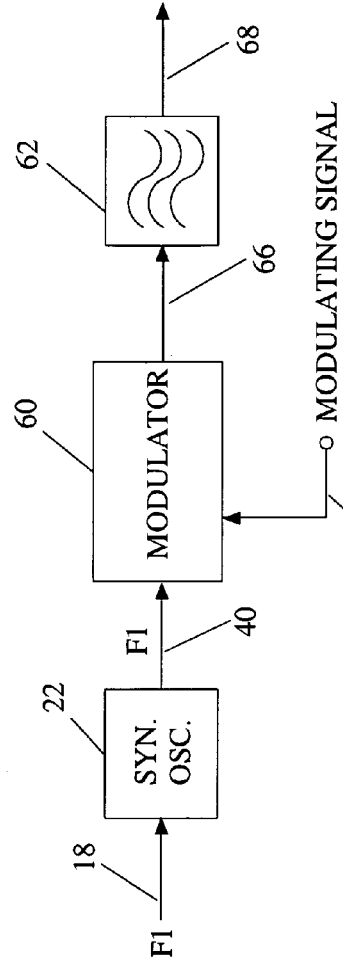
FIG. 22
FIG. 23

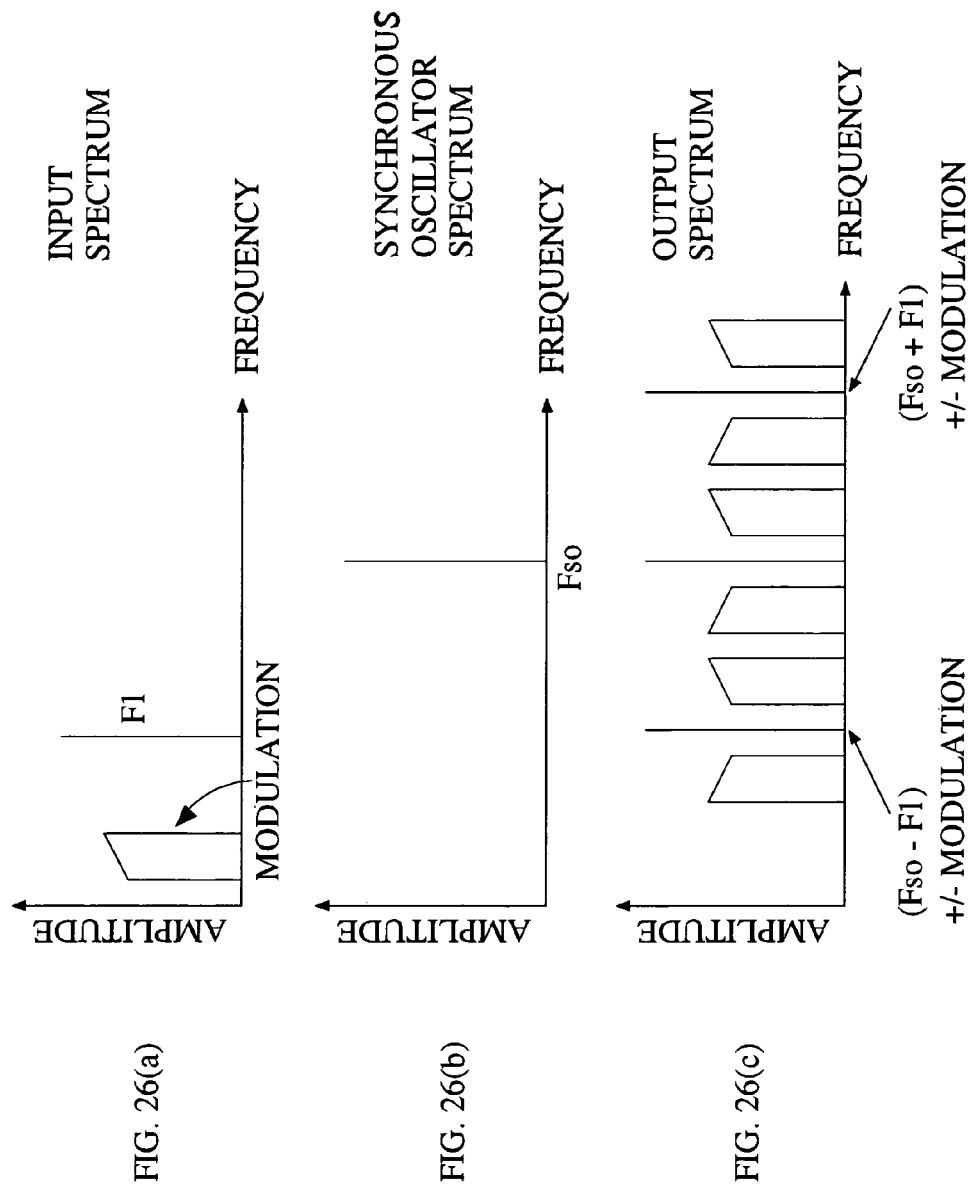

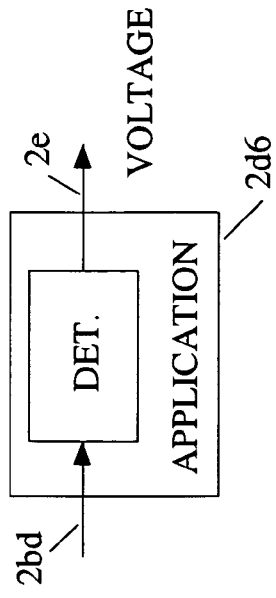
FIG. 27
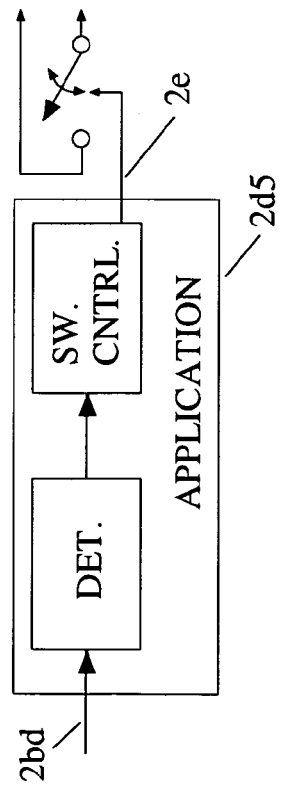
FIG. 28
FIG. 29
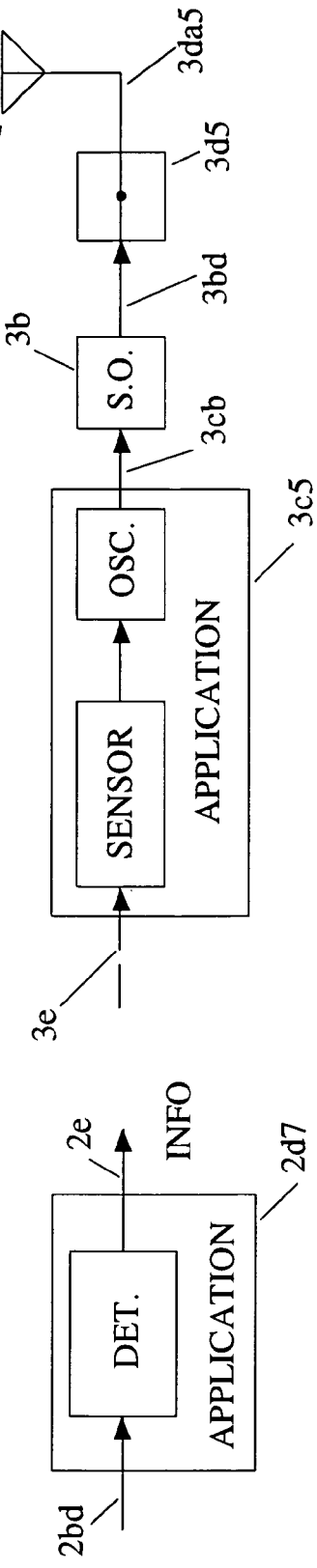
FIG. 30

OSCILLATOR COUPLED TO AN ANTENNA AND AN APPLICATION

CROSS REFERENCE TO RELATED APPLICATION

This application claims priority from U.S. provisional application Ser. No. 60/445,338 filed Feb. 5, 2003

TECHNICAL FIELD

The present invention relates to a low power radio frequency device that is either a receiver that responds to an incoming radio frequency interrogation signal by providing an output signal or a transmitter that provides an outgoing radio frequency signal in response to an input signal, or a combination of both a receiver and a transmitter.

BACKGROUND OF THE INVENTION

A device of this type would include a radio frequency transponder. Such a device transmits a reply signal upon reception of an incoming signal. It usually includes a receiver, responsive to the incoming signal, for providing an amplified intermediate signal and a transmitter, responsive to the amplified intermediate signal, for transmitting the reply signal.

For instance, present day radio frequency transponders are used to identify objects, possibly along with the contents thereof and even the location. An interrogator is used to send a radio frequency signal to the transponder, where the transponder will reply back, potentially with information, also with a radio frequency signal. Such transponders can be self-powered, enabling them to be mobile. Transponders are usually required to work at ranges that make it impractical to provide power by means of a radiated electric or magnetic field. The power supplies that are used to power the transponders are limited, meaning they contain or are able to supply only a limited amount of energy. Typically batteries are used but other sources could be used such as capacitors charged by solar or mechanical means, pressurized or flammable gas, etc. The consumption rate is proportional to the amount of time the transponder is powered to be operational.

These days it is becoming more and more important to run such devices with increased efficiency. Power consumption can be managed by having various modes, e.g., a standby (low power consumption), sleep (minimized power consumption) or reply mode (high power consumption). It is a desirable feature to have the transponder be available as much as possible, work at a long range but consume little power. These are conflicting requirements and tradeoffs are made to compromise one feature for the other. A way to increase battery life of a transponder would be to operate it with an on/off ratio, thereby making the transponder available only periodically. This would reduce the average power consumption at the cost of availability. In certain cases the power consumption and availability also become conflicting requirements.

To reliably cover the range between the interrogator and the transponder, a certain amount of power is required to develop signals of adequate levels to propagate energy between the units. As the range increases, power as seen by the receiving unit is reduced.

An increase of transmit power of the interrogator or receive sensitivity of the transponder will increase range capability to the transponder. This is accomplished at the expense of consuming more input power from a power source such as the above-mentioned battery.

A comparable amount of increase in range must be considered for both the interrogator and transponder since the path being used is two-way or bidirectional. Simply increasing the performance in one direction would provide no benefit. Providing more power to the interrogation signal to increase the range to the transponder will also provide no benefit if the interrogator is not sensitive enough to receive the transponder reply or the transponder is not powerful enough to respond back.

While excess battery power may be available at the interrogator, it may not be at the transponder. The transmit or reply section of the transponder typically can have its transmission time minimized to conserve power. The transponder reply could be a transmit burst that occurs when an interrogator requests a reply. However, the transmit burst may not be able to be reduced further in time without loss of transmitted information.

In a system where the interrogator could randomly interrogate the transponder, it would be required that the transponder receiver portion be operational and highly available for reliable operation. This may require that the transponder receiver be operational for much longer periods of time than the transponder reply section.

In an example, if the transponder is requested to reply 200 times per day, and transmits a burst of information with a duration of 10 milliseconds each time, the total transmit time per day would equal 2 seconds. If the receiver section is powered continuously, the ratio of receive time to transmit time is over 43,000:1. This large ratio shows that significant changes would have to be made in the manner that the transmit section consumes power for it to become the dominant power consuming source.

Therefore the only way to reduce the power consumption of the transponder is to increase its operating efficiency, and a need exists to significantly increase the operating efficiency of a receive section in a transponder. An increase in the operating efficiency of a transmit section in a transponder would also be beneficial. Such an advance could benefit radio frequency circuitry in general and could be applied to any kind of radio frequency circuitry including receiver, transmitters, and various signal-processing stages. Transponders have in the past used amplifiers in both the receiver and transmitter sections thereof. These amplifiers can consume most of the power needed to operate the unit.

The prior art approach using conventional amplifier technology will now be described. It would be desirable to achieve e.g. 80 dB gain with low power consumption. For conventional technology using amplifiers to achieve the 80 decibels of signal gain would require a power consumption of about 50 milliwatts per 20 decibels of gain, which translates to a current consumption of about 17 milliamps at a working voltage of 3 volts. See for instance a Mini-Circuits MAR6SM that uses 56 milliwatts while providing 20 decibels of gain (Mini-Circuits, P.O. Box 350166, Brooklyn, N.Y. 11235 USA; http://www.minicircuits.com). The total current consumption for the full 80 decibels of gain would be about four times the above-mentioned current consumption of 17 mA (for the 20 decibel gain amplifier), or 68 milliamps. For a limited power supply that only has an energy capacity of e.g. 170 milliamp hours (AA battery), this means that the conventional technology will run for about 170 maH/68 ma or for about 2.5 hours. Using the 170 maH power source and requiring for instance a receiver to run for a much longer period, e.g. a targeted 6 months, will limit the current consumption to an average current of about four microamps. This is about 17000 times less current consumption than what is possible with conventional technology.

Conventional super heterodyne receivers contain a local oscillator circuit that is crystal controlled and may take 10 milliseconds just to turn on. The cumulative turn-on time first needs to be considered, ignoring for the moment the need to run the receiver for a period of time after turn-on in order to perform its receiver function. To do this, a calculation is made to see how many 10 millisecond turn-on times can be performed in the targeted six month period. Each time the receiver is powered, it consumes 68 milliamps. Therefore the receiver can be turned on for (170/68)*(3600/10 ms)=900,000 times. Over a six month period, this would allow the receiver to operate about every 17.3 seconds. This is greater than the desired availability of every 5 seconds and only considers the turn-on time. Still only considering the turn-on time, if the device is turned on every 5 seconds for 10 ms, the original duration or goal of the battery being able to supply power for the sixth month period gets reduced to about 52 days. Looking at it a different way, becoming available every 5 seconds with a power consuming duration of 10 milliseconds each time, presents a duty cycle of 500 to one. Taking the original continuously powered receiver that lasted for 2.5 hours and extending the battery life by the accepted unavailability of the 500: 1 duty cycle will make the battery now last 2.5*500 or 1250 hours or about 52 days. This is shy of the target of 180 days or 6 months. This calculation also does not take into account leaving the receiver circuit on for some selected time after it turns on and becomes operational to actually receive the signal and detect any information.

Also, assuming a transponder application, a transmitter section or responding part of the device will consume additional power. An intelligent power control can be used to minimize the additional power required by activating this portion of the circuitry only when necessary. In an example, if this section of the circuitry is activated to respond every 5 seconds and consumes an additional 10 milliamps of current (in addition to the receive section) for an additional 10 millisecond duration, the additional load on the limited power source reduces the battery life to about one half the life as compared to just powering the receive section. This would reduce the battery life from 52 days to less than 26 days. It is therefore important to intelligently control the time during which the response section is activated. If the response section is activated only when required, in an example one hour per day, this only will increase the power consumption a few percent allowing the battery life to be a few percent less than the 52 day period or about 50 days.

Known transponders may use crystal detector receivers to receive a radio frequency interrogation signal modulated by an audio frequency signal and use audio amplification circuits for detection purposes. However, it such a circuit, the receive sensitivity is limited by the crystal detector sensitivity of approximately −50 dBm so the range is limited for a given interrogation power level. To get better sensitivity, other transponders use RF gain stages that are more sensitive but require more power. These devices are known to use power management but they inherently consume a large amount of power to obtain a higher degree of availability and sensitivity.

Synchronous oscillators (SOs) are known generally for instance from US 2003/0011438 A1 published Jan. 16, 2003 by Vasil Uzunoglu There, a modification of the synchronous oscillator is described, having regenerative positive feedback. The circuit includes an amplifier, a high-Q tank circuit, and a conventional synchronous oscillator feedback network. An additional feedback path provides a negative impedance conversion effect, according to Uzunoglu. There are various articles and US Patents by the same inventor Vasil Uzunoglu, (U.S. Pat. Nos. 4,335,404, 4,274,067, 4,356,456) relating to SOs (see the list at page 15 of US 2003/0011438). Various applications of the modified SO are shown. A further important characteristic of the synchronous oscillator is its energy efficiency. According to Uzunoglu, the regenerative feedback results in very little power dissipation, enabling the circuit to operate highly effectively with very low power supply requirements, for example, approximately 2–3 volts.

The above-mentioned importance of running radio frequency devices with increased efficiency is particularly important for portable devices. If a constantly powered synchronous oscillator were to be used in a portable radar or radio device with a limited power supply such as a battery, the limited power supply would run down rather quickly. For instance, two AA batteries in series (3 volts) only have approximately 170 milliAmpere-Hours of total energy available for a load such as an S.O. (e.g., 1 mA load) and will therefore last only for a week or so. Nonetheless, it would be desirable that the device e.g. a receiver be able to operate with batteries that are widely available, such as AA size alkaline types and have the batteries last at least for a six month period in a receive mode. It would also be desirable to have the receiver work continuously or be available often and very quickly. Such a receiver should be sensitive enough to receive an interrogator signal transmitted from an interrogator transmitter at a selected power, e.g., 1 milliwatt at a selected distance, e.g., of up to 150 meters at a frequency of around 950 MHz, for instance. In such an example, the transmit path length and interrogator power level will require the receiver sensitivity to be about −80 decibels below the 1 milliwatt power level because approximately that amount of power is lost in the path length alone (assuming the transmit signal from the interrogator is dissipated in all directions at once). For a robust receiver design it is desirable to have excess sensitivity, high availability, and minimized power consumption. Higher receiver gain will of course consume a proportionately higher amount of power.

BRIEF SUMMARY OF THE INVENTION

An object of the invention is to provide a portable radar or radio frequency device with improved power efficiency. This will allow the power source to last for a longer period of time for a given sensitivity. This can also allow the power source to become smaller.

Another object of the invention is to allow a higher sensitivity receiver for a given amount of power consumption in a radio frequency device.

Yet another object of the invention is to reduce the parts complexity required to build an adaptable multi-function radio frequency frequency signal processing stage with the benefits of increased reliability and reduced cost.

Still another object of the invention is to provide a low power signal processing stage that can be configured for many purposes and perform different functions for use in radio frequency circuitry.

According to a first aspect of the invention, a radio frequency device comprises an oscillator coupled to an application and to an antenna for providing an output signal in response to an input signal. Such a device may comprise a portable radio frequency device having a limited power supply. In that case, according to the present invention, the device further comprises a power control for controlling power provided to the device during a limited period so as to consume a correspondingly limited amount of power from the power supply. The portable device then comprises the oscillator powered by the power supply during such a limited period, the oscillator coupled to the application and to the antenna, the device for providing the output signal for carrying out the application during the limited period in response to the input signal received by the device and amplified by the oscillator during the limited period.

In further accord with the first aspect of the present invention, the antenna is for capturing an incoming radio frequency input signal for providing a captured signal coupled to the oscillator via a first part of the application and wherein the oscillator is responsive to the captured signal coupled thereto for providing an intermediate signal to a second part of the application for providing the output signal. The first part of an application may be an electrical node and the captured signal provided directly to the oscillator without conditioning by any prior application part. On the other hand, in another application, the first part of the application may condition the captured signal for providing a conditioned signal to the oscillator. In that case, the oscillator further conditions the conditioned signal for providing the intermediate signal as a further conditioned signal to the second part of the application. The second part of the application may also condition the intermediate signal from the oscillator. But the second part of the application could instead merely be an electrical node and the intermediate signal provided from the oscillator is then same as the output signal from the second part of the application.

In still further accord with the present invention, the oscillator comprises a plurality of oscillators connected in a series of stages. Each stage adds a gain factor which altogether provide a total gain for an incoming signal lockable at a frequency in a bandwidth range equal to an input bandwidth range within which a frequency of the incoming signal is received by the device.

Further in accord with the first aspect of the invention, the oscillator includes means for heterodyning two or more signals. At least one of the two or more signals may be externally injected and the means for heterodyning may include means for heterodyning the at least one of the two or more signals with a signal provided locally to one or more oscillators.

Further still in accord with the first aspect of the present invention, the device further comprises a switch, responsive to a limited power supply, for providing power to the device in a closed position thereof, and a switch control for controlling the switch in the closed position for providing power and in an open position for interrupting power.

Still further in accord with the first aspect of the present invention, a first application part of the application is responsive to the input signal for providing a conditioned signal, wherein the oscillator is responsive to the conditioned signal for providing an intermediate signal, wherein a second part of the application is responsive to the intermediate signal for coupling the intermediate signal to the antenna for providing an outgoing radio frequency signal. The second part of the application may be an electrical node and the intermediate signal from the oscillator may then be provided directly to the antenna without conditioning by the second part of the application. On the other hand, the second part of the application may condition the intermediate signal for providing a conditioned signal to the antenna which in turn provides the outgoing radio frequency signal for transmission. If the first part of the application is merely an electrical node, the conditioned signal from the first part of the application is therefore the same as the input signal and it is provided directly to the oscillator without any conditioning by the first part of the application. The first part of the application may instead condition the input signal for providing a conditioned signal to the oscillator. The first part of the application may also originate the conditioned signal provided to the oscillator. The oscillator may include means for heterodyning two or more signals. At least one of the two or more signals may be externally injected and the means for heterodyning may include means for heterodyning the at least one of the two or more signals with a signal provided locally to one or more oscillators.

Further in accord with the first aspect of the present invention, the device may be configured as a transponder by also using the antenna for receiving or by the addition of a receive antenna.

According further to the first aspect of the present invention, the first application part may be a pressure sensor circuit for providing the conditioned signal as a pressure signal having a frequency indicative of sensed pressure.

Further still in accord with the present invention, the device may be configured as a ranging device.

Still further in accord with the present invention, the device is part of a quadrature modulator.

Further in accord with the first aspect of the present invention, the second part of the application comprises a detector for providing a voltage output.

According to a second aspect of the present invention, a transponder comprises a first antenna responsive to an incoming radio frequency signal for providing a captured radio frequency signal, a first application part responsive to the captured signal, for providing a first coupled signal, an oscillator, responsive to the first coupled signal, for providing a conditioned output signal, a second application part responsive to the conditioned output signal, for providing a second coupled signal, and a second antenna, responsive to the second coupled signal, for providing an outgoing radio frequency signal. The transponder may use a shared antenna instead of using the first and second antennas as separate antennas. The transponder may be configured as a ranging device.

According to a third aspect of the present invention, a device comprising a quadrature hybrid for providing a pair of quadrature signals in response to an input signal, a pair of oscillators each responsive to a respective one of the quadrature signals for providing oscillator output signals, and a summer, responsive to the output signals from the oscillators, for providing a summed output signal. The device may further comprise a power control for controlling power provided from a power supply to the device to a limited period. The device may further comprise at least one antenna coupled to the device. The device may be a portable radio frequency device.

The device may further comprise a power control for controlling power provided from a power supply to the device to a limited period.

The present invention solves the problems of the prior art with the use of an oscillator circuit as an amplification device with low power consumption to meet the above stated goals of providing a receiver with a long battery life, e.g., of six months. A device built according to the present invention with the same total gain as conventional technology will consume about 1 milliamp of current and will run many times longer.

A certain type of oscillator, such as a synchronous oscillator (S.O.), can be employed in such a way as to behave as a sensitive receiver with filtering characteristics without the use of super heterodyning circuits that require the use of a local oscillator. According to the teachings of the present invention, an S.O. is very useful for the purpose of achieving good energy efficiency because it is not constantly biased. In other words, although the S.O. is constantly powered, it is not constantly consuming that power over each repetitive cycle. Moreover, a synchronous oscillator used as a receiver can turn-on and lock to incoming signals in less than 500 nanoseconds. Because of the fast lock time, the duty cycle of this type of receiver being turned on every 5 seconds is 500 nanoseconds/5 seconds=1 e-7. Multiplying this duty cycle by a run time goal of about 7 days will allow such a receiver to run for several years. The objects of the present invention therefore could only be met with the technology according to the teachings hereof including a synchronous oscillator used as a receiver with power management. This is due in large part to the low inherent power consumption of the S.O. and its ability to become operational in a short amount of time. Since the teachings hereof result in a battery consumption that is so much lower than the prior art e.g. with the AA size batteries, a smaller battery size could be used, making the overall receiver and battery package smaller, which becomes highly desirable for certain applications.

A modified S.O. circuit is shown with an optional crystal network. This option is not required in a receiver. It can however be used in a transmitter to make the transmit frequency different than the receive frequency. The crystal oscillator is not considered or included in the turn-on time calculations mentioned above, since the turn-on of this stage will only be required for transmit purposes.

These and other objects, features and advantages of the present invention will become more apparent in light of the following detailed description of a best mode embodiment thereof, as illustrated in the accompanying drawings.

BRIEF DESCRIPTION OF THE SEVERAL VIEWS OF THE DRAWING

FIG. 2 shows the device of FIG. 1 used as a receiver.

FIG. 3 shows the device of FIG. 1 used as a transmitter.

FIG. 4(a) shows an exemplary application for FIG. 2 comprising a filter coupling signals from an antenna to the input of a synchronous oscillator.

FIG. 4(b) shows a frequency spectrum that has been captured by the antenna for the example shown in FIG. 4(a).

FIG. 4(c) shows the filter response centered over only the desired signal to be input to a synchronous oscillator for the example shown in FIG. 4(a).

FIG. 4(d) shows all undesired signals removed by the filter and the one remaining signal being within the operating range of the synchronous oscillator for the example shown in FIG. 4(a).

FIG. 5(a) shows another exemplary application for FIG. 2 comprising a duplexer coupling signals from an antenna to the input of a synchronous oscillator.

FIG. 5(b) shows a frequency spectrum that has been captured by the antenna for the example shown in FIG. 5(a).

FIG. 5(c) shows the duplexer response centered over only the desired signals to be input to the synchronous oscillator for the example shown in FIG. 5(a).

FIG. 5(d) shows all undesired signals removed by the duplexer and the one remaining signal being within the operating range of the synchronous oscillator for the example shown in FIG. 5(a).

FIG. 6(a) shows still another exemplary application for FIG. 2 comprising a frequency converter coupling signals from an antenna to the input of a synchronous oscillator.

FIG. 6(b) shows a frequency spectrum that has been captured by the antenna for the example shown in FIG. 6(a).

FIG. 6(c) shows a local oscillator signal in the frequency converter for the example shown in FIG. 6(a).

FIG. 6(d) shows the frequency translated signal within the operating range of the synchronous oscillator for the example shown in FIG. 6(a).

FIG. 7(a) shows yet another exemplary application for FIG. 2 comprising a signal processor coupling signals from an antenna to the input of a synchronous oscillator.

FIG. 7(b) shows a frequency spectrum that has been captured by the antenna at two different times t1 and t2 for the example shown in FIG. 7(a).

FIG. 7(c) shows a local oscillator signal in the signal processor at two different times t1 and t2 for the example shown in FIG. 7(a).

FIG. 7(d) shows the processed signals at times t1 and t2 within the operating range of the synchronous oscillator for the example shown in FIG. 7(a).

FIG. 8(a) shows an exemplary application for FIG. 3 comprising a filter coupling signals to an antenna from the output of a synchronous oscillator.

FIG. 8(b) shows a frequency spectrum at the output of the synchronous oscillator for the example shown in FIG. 8(a).

FIG. 8(c) shows a filter response centered over only the desired signal to be input to the antenna for the example shown in FIG. 8(a).

FIG. 8(d) shows all undesired signals removed by the filter and the desired signal remaining to be radiated by the antenna for the example shown in FIG. 8(a).

FIG. 9(a) shows another exemplary application for FIG. 3 comprising a duplexer coupling signals to an antenna from the output of a synchronous oscillator.

FIG. 9(b) shows a frequency spectrum at the output of the synchronous oscillator for the example shown in FIG. 9(a).

FIG. 9(c) shows a duplexer response centered over only the desired signal to be input to the antenna for the example shown in FIG. 9(a).

FIG. 9(d) shows all undesired signals removed by the duplexer and the desired signal remaining to be radiated by the antenna for the example shown in FIG. 9(a).

FIG. 10(a) shows still another exemplary application for FIG. 3 comprising a frequency converter coupling signals to an antenna from the output of a synchronous oscillator.

FIG. 10(b) shows a frequency spectrum at the output of the synchronous oscillator for the example shown in FIG. 10(a).

FIG. 10(c) shows a local oscillator signal in the frequency converter for the example shown in FIG. 10(a).

FIG. 10(d) shows a frequency translated signal from the output of the frequency converter to be radiated by the antenna for the example shown in FIG. 10(a).

FIG. 11(a) shows yet another exemplary application for FIG. 3 comprising a signal processor coupling signals to an antenna from the output of a synchronous oscillator.

FIG. 11(b) shows a frequency spectrum of the output of the synchronous oscillator at two different times t1 and t2 for the example shown in FIG. 11(a).

FIG. 11(c) shows a local oscillator signal in the signal processor at two different times t1 and t2 for the example shown in FIG. 11(a).

FIG. 11(d) shows processed signals at times t1 and t2 to be radiated by the antenna for the example shown in FIG. 11(a).

FIG. 12 shows a receiver of FIG. 2 combined with a transmitter of FIG. 3 as a transponder.

FIG. 17 shows the output of the synchronous oscillator of FIG. 16 in terms of frequencies.

FIG. 18 shows the crystal oscillator feedback path of FIG. 16 in isolation.

FIG. 19 shows a generalized resonant network such as that shown in FIG. 18, except being any kind of resonant network, either alone or with another similar resonant network.

FIG. 20 shows a synchronous oscillator with two externally injected signals as well as a modulation input, according to the present invention.

FIG. 21 shows the signal processing stages of a receiver, such as in the transponder of FIG. 12(a), with three stages of synchronous oscillators, the center stage having a crystal oscillator such as shown in FIG. 16, and the final stage filtering out all but a frequency of interest.

FIG. 22 shows the signal processing stages of another three-stage synchronous oscillator receiver, except using an external modulated source to provide a frequency offset, according to the present invention.

FIG. 23 shows a single synchronous oscillator in series with a modulator and a filter, the modulator being modulated by a modulating signal, according to the present invention.

FIG. 26(a) shows an input modulation signal and frequency F1 that will be heterodyned with a synchronous oscillator operating frequency for the modified synchronous oscillator shown in FIG. 20.

FIG. 26(b) shows the operating frequency of a synchronous oscillator.

FIG. 26(c) shows the output spectrum of a synchronous oscillator that has heterodyned the modulation signal and frequency F1 of FIG. 26(a) with the operating frequency of the synchronous oscillator shown in FIG. 26(b).

FIG. 27 shows an application that controls the position of a switch.

FIG. 28 shows an application that outputs a voltage.

FIG. 29 shows an application that can output information such as video or audio.

FIG. 30 shows an application that transmits sensor information.

DETAILED DESCRIPTION OF THE INVENTION

Figure 1:
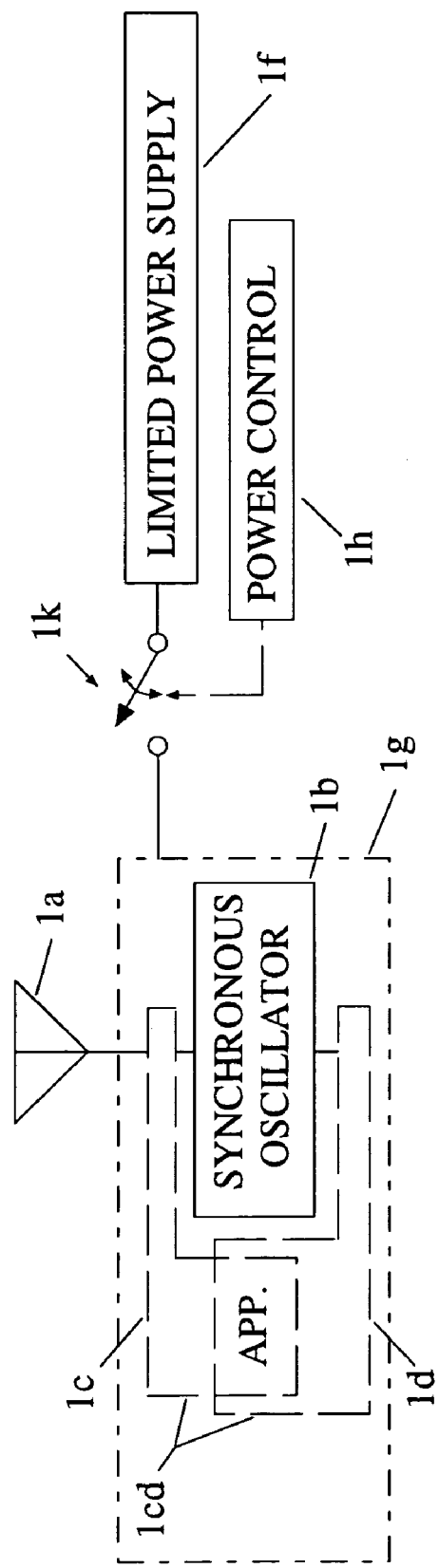
FIG. 1 shows an application as part of a device also including an antenna and a synchronous oscillator.

FIG. 1 shows a radio frequency device, according to the present invention, comprising an application 1cd coupled to an antenna 1a and to an oscillator which is preferably but not necessarily a synchronous oscillator (S.O.) 1b. The antenna and the S.O. work together with the application 1cd to carry out the ends of the application which can be various. According to the present invention, the application takes advantage of the signal processing properties of the S.O. The application 1cd is shown comprising two parts, one part 1c coupled between the antenna 1a and the S.O. and the other part 1d coupled to the S.O. on the other side of the S.O., but it should be realized that the application may comprise one or both parts 1c, 1d. Either or both application parts 1c, 1d can exist in a given embodiment and their functions can be separate or overlapping but nonetheless together constitute an application. The application therefore interfaces with an input, an output, or both the input and the output of the S.O. If the application part 1c is interfaced with the input to an S.O. 1b, then the application part 1d interfaces with the output of an S.O. 1b. In a similar fashion, if the application part 1c is interfaced with the output of an S.O. 1b then the application part 1d interfaces to the input of the S.O. 1b. As shown below, signals can be received, transmitted, or both by the synchronous oscillator in these configurations.

For instance, the radio frequency device of FIG. 1 may be used as shown in FIG. 2 as a receiver. In that case, an incoming radio frequency signal 2 transmitted e.g. by an interrogator (not shown) in air or free space is captured by an antenna 2a which is responsive to the incoming signal and a captured signal is provided on a line 2ac. The signal on the line 2ac may be injected into an application part 2c. In that case, the application part 2c can perform signal processing on the signal on the line 2ac before outputting the conditioned signal on a line 2cb to an S.O. 2b. The application part 2c can originate signals that are injected into S.O. 2b by the signal on the line 2cb along with the signal that was supplied from the line 2ac. If the connection between the line 2ac and the line 2cb is direct, the application part 2c is nothing more than an electrical node and the signal on the line 2ac and the line 2cb is the same. The S.O. 2b performs signal processing on the input signal(s) on the line 2cb and outputs a conditioned, intermediate signal on a line 2bd to application part 2d. The application part 2d uses the conditioned, intermediate signal from the line 2bd to perform the remaining function of the application. The application part 2*d* performs signal processing on the intermediate signal on the line 2*bd* and uses the processed signal for the function of the application. If required for a specific application, an output signal from the application part 2*d* is made available on a line 2*e*. If the application part 2*d* simply contains an electrical node between lines 2*bd* and 2*e*, the signal out of the application part 2*d* on the line 2*e* is the same as the signal on the line 2*bd* output from the S.O. 2*b* on the line 2*bd*.

The device of FIG. 1 may take the form of a portable radio frequency device having a limited power supply 1*f* such as a battery. In such a device, according to the present invention, power is provided to the synchronous oscillator during a limited period so as to consume a correspondingly limited amount of power from the limited power supply. The illustrated limited power supply 1*f* may be connected to either the S.O., the application or to a combination 1*g* of both the S.O. and the application, under the control of a power controller 1*h* that controls the on-off position of a switch 1*k* connecting the limited power supply to the combination 1*g* of the application 1*cd* and the S.O. 1*b*. The limited power supply 1*f* might for instance be a battery and the power control controlling the switch to only periodically apply power from the battery to the S.O. 1*b*, to the application 1*cd*, or both. In such a case, the power control of FIG. 1 may be used to cause the limited power supply or battery to supply power to the S.O. 1*b* for 10 ms every 5 seconds. This gives a duty cycle of 500 to 1. Such a duty cycle would increase the battery life by 500 to 1 over continuous power consumption. That would make two AA batteries last for years instead of days.

Consequently, the device of FIG. 1 taking the form of a portable radio frequency device may have a power supply and a power control for controlling power provided to the device during a limited period so as to consume a correspondingly limited amount of power from the power supply. Such a portable device comprises the synchronous oscillator (1*b*) powered by the power supply during the limited period, the synchronous oscillator coupled to the application (1*cd*; 1*c*; 1*d*) and to the antenna (1*a*), the device for providing the output signal (2*e*; 3) for carrying out the application during or only during the limited period in response to the input signal (2; 3*e*) received by the device and amplified by the synchronous oscillator during the limited period.

Likewise, the device of FIG. 2 may take the form of a portable radio frequency device having a limited power supply 2*f* such as a battery. In such a device, according to the present invention, power is provided to the synchronous oscillator via a switch 2*k* during a limited period so as to consume a correspondingly limited amount of power from the limited power supply. The switch is controlled open or closed by a control 2*h*. Gain is imparted to the input signal by the synchronous oscillator during such a limited period (if an input signal is present). A correspondingly limited amount of power is consumed from the limited power supply. If and when a sending device (e.g., interrogator) is present and it sends an interrogation signal, if the duration of the interrogation (input) signal is controlled by the sending device so as to provide a discontinuous interrogation signal in the form of a pulse, burst or the like (that only lasts for a limited period and may not present at other times), then the period of the interrogation pulse can be set up so as to extend longer in time than the time between applications of power to the SO in the receiver. In that way, an overlap in the timing of the power-up of the SO and the pulse is ensured without needing any timing control between the sending device and the receiver. For instance, if the sending device sends a continuous interrogation signal for 5 seconds, the receiver can be set up to turn on for 10 ms every 5 seconds and it will definitely receive at its input any interrogation signal sent by the sending device.

FIG. 3 shows an outgoing radio frequency signal 3 transmitted in air or free space by an antenna 3*a* connected to a synchronous oscillator 3*b* via an application 3*cd* which may comprise one or both application parts 3*c*, 3*d*. An application part 3*c* injects a conditional signal or a plurality of conditional signals into S.O. 3*b* on a signal line 3*cb*. Signals can be injected into application part 3*c* on a line 3*e*. The application part 3*c* can perform signal processing on the signal on the line 3*e* as well as generate signals internally before outputting a conditioned signal on the line 3*cb*. The S.O. processes the signal(s) and provides an intermediate signal output on a line 3*bd* to the application part 3*d*. The application part 3*d* can perform signal processing on the signal on the line 3*bd* as well as generate signals before outputting a conditioned signal on the line 3*da*. If the connection between the line 3*bd* and the line 3*da* is direct, the application part 3*d* is nothing more than an electrical node and the signal on the line 3*bd* and the line 3*da* is the same. The output signal of the application part 3*d* on the line 3*da* is injected into an antenna 3*a* for transmission. The antenna 3*a* in turn provides the outgoing radio frequency signal on the line 3.

Like the devices of FIGS. 1 and 2, the device of FIG. 3 may take the form of a portable radio frequency device having a limited power supply 3*f* such as a battery. In such a device, according to the present invention, power is provided via a switch 3*k* under the control of a power controller 3*h* to the synchronous oscillator during a limited period so as to consume a correspondingly limited amount of power from the limited power supply. Gain will be imparted to any input signal 3*cb* that happens to be present by the synchronous oscillator 3*b* during or only during the limited period of availability of the power supply.

The power control 1*h*, 2*h*, 3*h* of FIGS. 1–3 may take many different forms. For instance, it could be a pulse generator that closes the switch 1*k*, 2*k*, 3*k* according to the timing and duration of its pulsed output. It could be a time-of-day clock that closes the switch for a timed period one or more times per day. It could be a manual control that allows a user to turn the device on or off with the push of a button. A low cost example that only uses a few microamps would be a fifteen stage (15 flip flops) counter that counts clocks output by a clock oscillator connected to a crystal oscillator providing a 32768 Hz continuous wave output. Every time the counter reaches full count to 32768 (every second), it outputs a pulse that drives another counter driven by the clock oscillator that may count 333 clocks to provide an on time pulse of about 10 milliseconds every second. The on time pulse is used to close the switch 1*k*, 2*k*, or 3*k*.

Therefore, to conserve power, according to the teachings hereof, a power control circuit can be used to deliver power with a specific duty cycle where there is a period of time where the device is powered and available to operate, and there will be a period of time that the device is powered down and not available. This conserves power from a power source at the cost of availability. Using the above-mentioned parameters, the device can be made to be available within a 5 second period to reduce power consumption as compared to a device that is continuously powered. The device is placed in a state of minimized power consumption to conserve the limited capacity of the power supply. During the state of zero or minimal power consumption, the device is off or not fully operational and will not perform to specification. A periodic duration of applied power allows the device to perform to desired specification while consuming power.

According further to the teachings of the present invention, a solution to meet the goals of providing a device such as a receiver that is available for e.g. a 6 month period is to use the low power oscillator technology with a power conserving control circuit. For instance, the ratio of current of the conventional technology as compared to a synchronous oscillator (S.O.) circuit is about 68 to 1. Since the S.O. circuit consumes 68 times less current than the conventional technology, a receiver with the above stated duty cycle of 500 to 1 will allow an S.O. receiver to run much longer than the goal of six months. The original calculation of a run time of 52 days is extended to 68 times this period due to the lower power consumption of the oscillator circuits. This turns out to be almost a ten year period, and is probably longer than the shelf life of the batteries being used. To use the battery power over its shelf life which could be 3 years, would allow the receiver to become available more frequently. The excess power available could also be advantageously used to allow a response section to reply more often, or allow the battery size to be reduced, or combinations of both. Another factor that should be realized is the fact that an S.O. circuit can become operational much faster than conventional technology, requiring a shorter turn on period, consuming a proportionately lower amount of power.

The devices of FIGS. 1–3 are put to use by means of an application having some purpose. Each is therefore a device that transforms a signal into a useful output having some end purpose. Stated otherwise, the purpose of the device is achieved by the cooperation of its parts including the application part. The purpose may vary widely and may include those shown below such as RF identification (in a transponder application), ranging, vehicle tire air pressure sensing, controlling a switch, conveying information, quadrature modulation for communications circuits, and many others not shown.

Such a device may contain one or more signal processing stages to achieve the goal of producing the useful output. Signal processing includes but is not limited to, signal amplification, heterodyning, filtering, generation and modulation, separately, or combined such as a heterodyning mixing function with signal gain. The device may use the attributes of S.O. stages to perform signal processing in whole or in part. An example of a device according to the invention is a radio receiver that produces an audible output. The audible output is the useful output of the device. S.O. stages can be used as intermediate signal processing stages in such a radio receiver. The S.O. stages along with the application part or parts process the signal captured by an antenna to provide the proper signal to the final stage of the receiver that produces the audio output. The S.O. stages can accept and inject signals from parts of the application. The device can become as simple as a single S.O. stage with electrical nodes on the input and output if the S.O. stage produces a useful output and performs a desired function.

Simple devices comprising a combination of an S.O. and application parts are shown in FIGS. 1, 2 and 3. The synchronous oscillators $1b$, $2b$, $3b$ of FIGS. 1, 2 and 3 each comprise one or more synchronous oscillators. Details of synchronous oscillator will be shown in more detail below in connection with FIG. 13, for example. In the case of the synchronous oscillator $2b$ of FIG. 2, it is responsive to the signal on the line $2cb$ from the application part $2c$ or alternatively is responsive directly to the signal on the line $2ac$ from the antenna $2a$ for providing the synchronous oscillator output signal on the line $2bd$. In the case of the synchronous oscillator $3b$ of FIG. 3, it is responsive to the signal on the line $3cb$ from the application part $3c$ for providing the synchronous oscillator output signal on the line $3bd$. The output signal on the line $2bd$ in FIG. 2 may be used for some purpose exclusively within some device within which the device of FIG. 2 resides or for some external purpose. For instance, the output signal on the line $2bd$ may be used externally to activate an alarm or to trigger performance of some control function or mechanism. Or, it may be used as the signal on the line $3e$ to an application similar to the application part $3c$ of FIG. 3 to form a transponder, as will be shown below in connection with FIGS. 12 and 12($a$). Likewise, the signal on the line $3cb$ of FIG. 3 input to the synchronous oscillator $3b$ may be unrelated to any signal from a receiver and may originate from some other internal or external source, depending on the structure of any device within which the device of FIG. 3 may reside. Multiple combinations of an S.O. and application parts (not shown) may be required to be cascaded in series, parallel, or combinations of each to provide an application with the proper signal processing path. This means there can be numerous S.O.'s in a specific application along with the application parts. The S.O. stages can also be mixed in this fashion with conventional radio frequency technologies to support a specific application.

Several examples of different types of applications that can be used to provide the input signal on the line $2cb$ to the S.O. $2b$ as shown in FIG. 2 are shown in FIGS. 4($a$) through 7($a$) with signal properties shown along the signal path in the adjacent FIGS. (b), (c) and (d).

FIG. 4($a$) shows a filter $2c1$ as an application part. The filter is used to remove undesired signals captured from an antenna $2a$. The antenna $2a$ captures both desired and undesired signals as shown in FIG. 4($b$) and injects them into the filter on the line $2ac$. The filter $2c1$ has a frequency response that passes the desired signal and rejects the undesired signals as shown in FIG. 4($c$). The desired signal from the output of the filter on the line $2cb$ is the one that will provide the S.O. with a proper operating signal and is shown in FIG. 4($d$). Another application part $2d1$ is responsive to an output signal on the line $2bd$ from the S.O. $2b$ and performs functions that depend on the frequency input of the S.O. being as shown in FIG. 4($d$).

FIG. 5($a$) shows a three port device such as a receiver portion of a duplexer, circulator, switch, or the like as an application part $2c2$. The duplexer operates in a similar fashion as a filter. A duplexer is comprised of more than one filter allowing combinations of transmitters and receivers to share a common antenna. The receiver portion $2c2$ of the duplexer is used to remove undesired signals captured from antenna $2a$. The antenna $2a$ captures the desired and undesired signals as shown in FIG. 5($b$) and injects them into the receiver portion $2c2$ of the duplexer on the line $2ac$. The receiver portion $2c2$ of the duplexer has a frequency response that passes the desired signal and rejects the undesired signals as shown in FIG. 5($c$). The desired signal from the output of the duplexer on the line $2cb$ is the one that will provide the S.O. with the proper operating signal for an application part $2d2$ and is shown in FIG. 5($d$). The application part $2d2$ performs functions that depend on the frequency input of the S.O. being as shown in FIG. 5($d$).

FIG. 6($a$) shows a frequency converter $2c3$ as an application part. The frequency converter translates signals through the use of a local oscillator and frequency mixer. Input frequencies to the converter that are not able to allow proper operation of the S.O., for purposes of another application part 2d3, can be frequency translated so proper operation of the S.O. is possible. Signals are captured by the antenna 2a and injected on the line 2ac to the frequency converter. This injected signal is shown in FIG. 6(b) and is at the wrong frequency as shown in FIG. 6(b) for proper operation of the S.O. for purposes of the other application part 2d3. A local oscillator signal is produced as shown in FIG. 6(c) for the purpose of translating the input frequency on the line 2ac to a signal having a different frequency as shown in FIG. 6(d) and on the line 2cb in FIG. 6(a) for proper operation of the S.O. 2b. The translated frequency on the line 2cb and as shown in FIG. 6(d) is injected into the S.O. 2b. The application part 2d3 performs functions that depend on the frequency input of the S.O. being as shown in FIG. 6(d).

FIG. 7(a) shows a signal processor 2c4 as an application part. The signal processor can take on many forms, but the operation may be similar to a frequency converter. For instance, the signal processor may be adaptive to the input signal to continuously provide an appropriate operating signal for proper operation of the S.O. 2b. Signals are captured by the antenna 2a and injected on the line 2ac to the signal processor 2c4. The injected signal on the line 2ac changes with time and is shown in FIG. 7(b). At times t1 and t2 the signal on the line 2ac is at corresponding frequencies F1 and F2 which are both at a wrong frequency for proper operation of the S.O. 2b for purposes of another application part 2d4. A time adaptive intermediate signal is developed by a signal processor local oscillator (not shown) and is provided for the purpose of translating the input frequencies on the line 2ac to frequencies on the line 2cb for proper operation of the S.O. 2b. The local oscillator of the signal processor 2c4 operates at various operating frequencies which can change frequency and or phase with time. This local oscillator frequency is updated at times t1 and t2 and is shown in FIG. 7(c). Note that the frequencies at times t1 and t2 of the signal processor oscillator may be different than the frequencies at times t1 and t2 of the antenna spectrum. The local oscillator frequency must change at the same time as the signals captured by the antenna for the purpose of providing the S.O. with an appropriate operating signal. The translated frequencies on the line 2cb are shown in FIG. 7(d) and injected into the S.O. 2b at a same desired frequency which may be different from the frequencies shown in FIGS. 7(b) and 7(c), as shown.

The synchronous oscillator 3b of FIG. 3, on the other hand, is responsive to a synchronous oscillator input signal on a line 3cb for providing the synchronous oscillator output signal on the line 3bd to either the application 3d or directly to the antenna for being transmitted as the outgoing signal on the line 3 of FIG. 3.

Several examples of different types of applications that can be used on the output of the S.O. as shown in FIG. 3 are shown in FIGS. 8 through 11 with signal properties shown along the signal path.

FIG. 8(a) shows a filter as an application part 3d1. The filter is used to remove undesired signals on the line 3bd from the S.O. 3b. Both desired and undesired signals are shown in FIG. 8(b) and are injected into the filter 3d1 on the line 3bd. The filter 3d1 has a frequency response that passes the desired signal and rejects the undesired signals as shown in FIG. 8(c). The desired signal from the output of the filter 3d1 on the line 3da is provided to the antenna 3 and is shown in FIG. 8(d).

FIG. 9(a) shows a three port device such as a duplexer, circulator, switch, or the like, in conjunction with an application part 3d2. A duplexer with the application part 3d2 operates in a similar fashion as a filter. The duplexer is comprised of more than one filter allowing combinations of transmitters and receivers to share a common antenna. The duplexer is used to remove undesired signals on the line 3bd from the S.O. 3b. Desired and undesired signals as shown in FIG. 9(b) are injected into the duplexer on the line 3bd. The duplexer has a frequency response that passes the desired signal and rejects the undesired signals as shown in FIG. 9(c). The desired signal from the output of the duplexer on the line 3da is provided to the antenna 3 and is. shown in FIG. 9(d). An application part 3c2 provides an input signal on a line 3cb to the S.O. and could be any application.

FIG. 10(a) shows a frequency converter as an application part 3d3. The frequency converter translates signals through the use of a local oscillator and frequency mixer. The output signal from S.O. 3b on the line 3bd is input to the frequency converter 3d3. The injected signal shown in FIG. 10(b) is at the wrong frequency for transmission by the antenna 3. A signal provided by the local oscillator as shown in FIG. 10(c) is provided to a mixer for the purpose of translating an input frequency on the line 3bd to a desired frequency on the line 3da. A translated frequency on the line 3da is shown in FIG. 10(d) and is injected into the antenna 3 for transmission.

FIG. 11(a) shows a signal processor as a application part 3d4. The signal processor can take on many forms, but the operation may be similar to a frequency converter. For instance, the frequency converter local oscillator may operate at various operating frequencies which can change frequency and or phase with time. In such a case, the signal processor may for example be adaptive and continuously adapt to provide a signal proper for transmission by the antenna 3.

The S.O output frequency on the line 3bd may be as shown in FIG. 11(b) and not change frequency at times t1 and t2. A signal developed by a signal processor local oscillator (not shown) is provided for the purpose of translating the input frequencies on the line 3bd by means of a mixer (not shown) to frequencies on the line 3da for transmission by the antenna 3. The local oscillator frequency is updated at times t1 and t2 and is shown in FIG. 11(c). The S.O output frequency on the line 3bd is frequency translated by the frequency converter 3d4 to the output frequencies on the line 3da and shown in FIG. 11(d). The signals on the line 3da are then injected into the antenna 3 for transmission.

It will therefore be realized that the radio frequency device of the present invention can be configured as a receiver or a transmitter, in either case taking advantage of the properties of the synchronous oscillator 2b or 3b, to be described below in more detail. But first a device combining both a receiver and transmitter, each according to the present invention, will be shown.

Figure 12A:
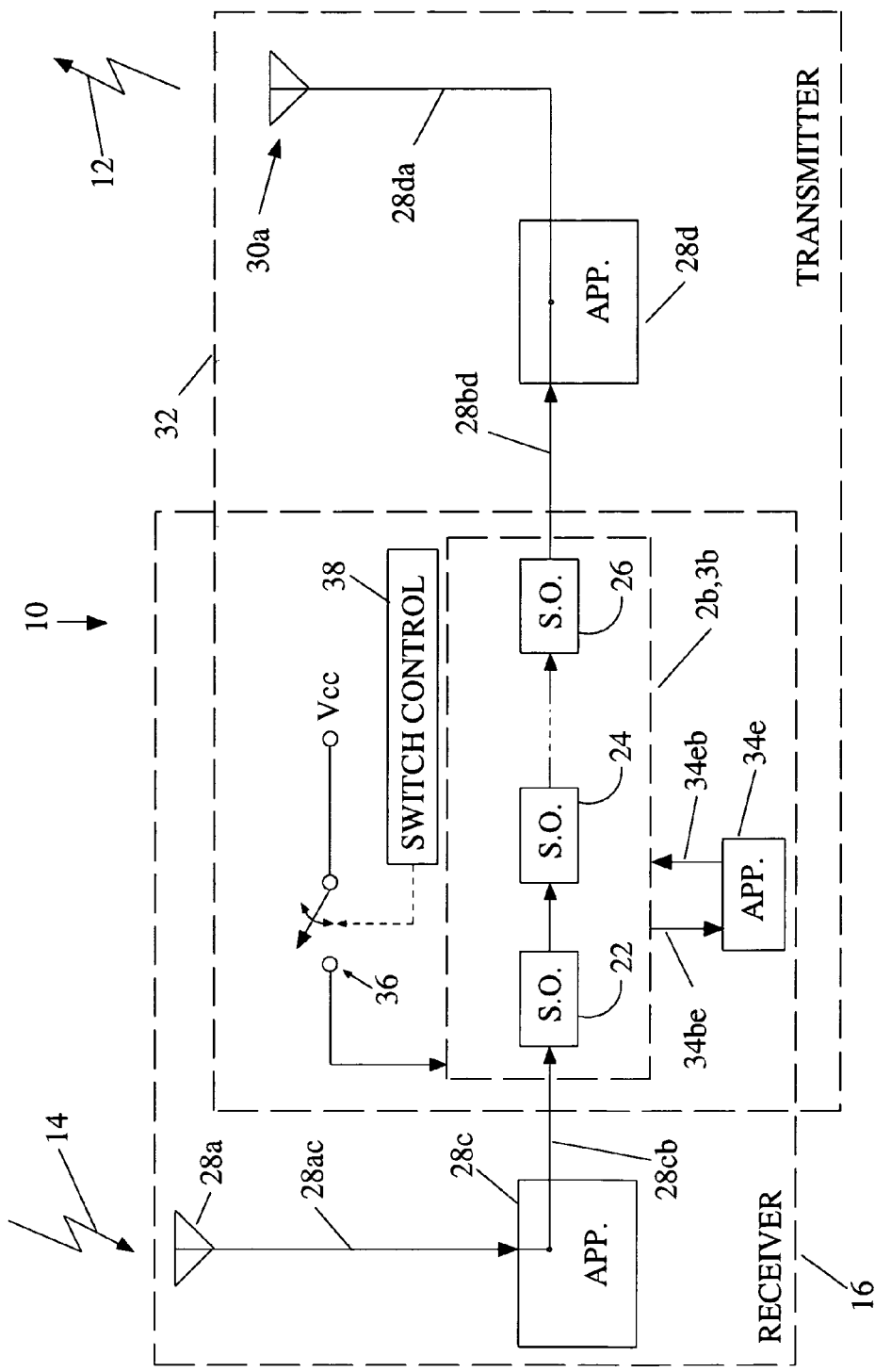
FIG. 12(a) shows a transponder, according to the present invention, with a single synchronous oscillator or multiple stage synchronous oscillators used in both the receiver part and the transmitter part of the transponder.

FIG. 12 shows a radio, or radar transponder 10 that transmits a radio frequency reply signal 12 upon reception of an incoming radio frequency signal 14. A transponder is a receiver/transmitter pair. The receiver configured according to FIG. 2 is converted to a transponder by the addition of a transmit antenna on the line 2e. Likewise, the transmitter configured according to FIG. 3 is converted to a transponder by the addition of a receive antenna on the line 3e. The transponder 10, shown in greater detail in FIG. 12(a), comprises a receiver 16, configured according to FIG. 2, responsive to the incoming (input) signal on the line 14 for providing a receiver output signal on a line 28bd by means of one or more synchronous oscillators 22, 24, ... 26 within the S.O. block 2b. The transponder can reply at the same frequency that is transmitted to it. Signal processing either in the S.O. stages or the attached application parts can create a different reply frequency.

According to the present invention, one or more synchronous oscillators such as those shown in FIG. 12 can be used in the receiver of a transponder to perform a process of amplification like linear amplifiers but with low power consumption as explained more fully below in connection with FIG. 15. It should be realized that although a transponder is shown with separate receive and transmit antennas, a single antenna may be shared by the receive and transmit sections using a common connection, a duplexer, a switch, or the like. Two antennas are shown but a single antenna is equivalent, at least for purposes of the invention.

Figure 13:
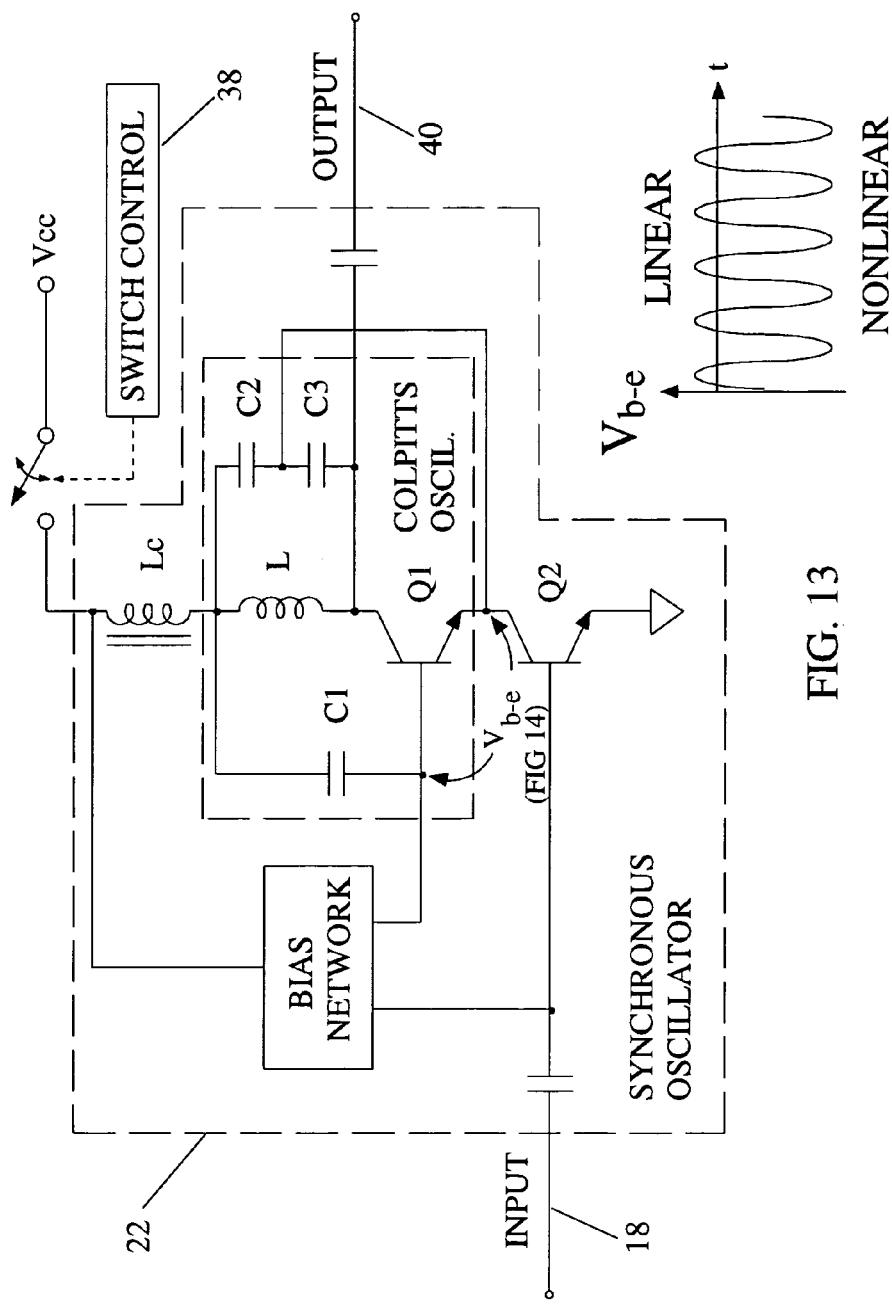
FIG. 13 shows a synchronous oscillator such as used in the transponder of FIG. 12, according to the present invention.

Signal gain is the measurement of amplification, and is defined as the ratio of the output signal level to the input signal level. For example, the gain of synchronous oscillator 22 as shown in FIG. 13 is calculated by dividing the output signal level on line 40 by the input signal level on line 18. Power gain is typically expressed in units of decibels and is calculated by the following mathematical formula:

Power gain in decibels=10*logarithm (output signal power level/input signal power level)

The receiver 16 of FIG. 12(a) may receive the incoming signal 14 from an antenna 28a in the case of an incoming radio frequency signal. The antenna 28a provides the incoming signal as a signal on a line 28ac to a first application part 28c of the receiver 16. The first application part 28c provides a coupled signal on a line 28cb to the S.O. 2b. The antenna 28a, the first application part 28c, and the S.O. 2b of FIG. 12(a) should be viewed as an example of the device of FIG. 2 wherein the antenna 28a may be connected directly to the synchronous oscillator. In that case, the first application part 28c is simply an electrical node and the signals on lines 28ac and 28cb are the same.

However, the signal processing of the S.O. block 2b can be affected by a second application part 34e. Second application part 34e accepts signals from one or more synchronous oscillators 22, 24 . . . 26 within the S.O. block 2b on a line 34be. Likewise, second application part 34e can inject signals into one or more synchronous oscillators 22, 24 . . . 26 within the S.O. block 2b on a line 34eb. The second application part 34e can be viewed as part of an application also including first application part 28c so as to be consistent with the previous description of FIG. 2 and the examples of FIGS. 4–7. In this case, the first application part 28c is merely a node.

The transponder 10 also includes a transmitter (like that of FIG. 3) including the S.O. 2b, 3b, a third application part 28d, and an antenna 30a. In the radio frequency case of FIG. 12(a), the third application part 28d will provide a signal on a line 28da to the antenna 30a which in turn provides the reply signal on the line 12. The signals on the lines 14 and 12 are, of course, radio frequency signals propagating in the air or free space. In some cases, it may be desirable to utilize an in-line switch as the third application part 28d that is only closed when an input signal is being received and amplified by the S.O. 2b, 3b. This will suppress any radiation of the oscillations occurring in the tank circuit of the S.O. 2b, 3b when the S.O. is being periodically powered-on despite the absence of an input interrogation signal. This may be accomplished by having a switch control sensing for the presence of an input signal and closing the switch to connect the S.O. output to the antenna 30a only upon sensing such an input signal received by the antenna 28a. If such a switch were not used, the signal radiated from the transmit antenna 30a would not be carrying out the purposes of the application. Such might or might not be harmful, depending on the circumstances, so the use of such a switch is a design choice.

In the context of the above-discussed receiver and transmitter, the S.O. 2b, 3b of FIG. 12(a) in effect performs double-duty, performing both the role of the receiver S.O. 2b of FIGS. 2 and the transmitter S.O. 3b of FIG. 3. Alternatively, the S.O. 22 can be viewed as the S.O. 2b of FIG. 2 while the S.O. 26 may be viewed as the S.O. 3b of FIG. 3. The receiver and transmitter boundaries of FIG. 12 would then change accordingly to show the receiver and transmitter as non-overlapping, e.g., with S.O. 24 and any other intermediate S.O.s "coupling" distinct receiver and transmitter parts of the transponder. Or, S.O. 24 could be shown within the receiver and any other S.O.s within the transmitter. It should be evident that a cascaded chain of S.O.s can be viewed as partly in the receiver and partly in the transmitter.

It should also be realized that although the application 28c and the application 28d of FIG. 12(a) are shown separately, in a non-overlapping way, they nonetheless can also be viewed (depending on the circumstances) as related applications or at least as overlapping applications as shown in FIG. 12 and as described previously. In any event, the applications will usually be related, depending on the specific application, but will perform distinct functions.

FIG. 12(a) also shows an optional power supply $V_{cc}$ providing power to the S.O. 2b, 3b through a switch 36. A switch control 38 controls the duty cycle of the switch 36 so as to make the S.O. active only during a portion of the time. This allows for conservation of power in the receiver and can be controlled anywhere from the switch always being closed, to some portion of the time being open, to always being open. In many cases, the transmitter need only be active infrequently to reply and its power consumption can be controlled separately from the receiver (not shown).

It should be realized that a single or multiple stage synchronous oscillator (as shown) may be used in the S.O. 2b, 3b of the RF/radar transponder 10. The S.O. stages can also be mixed with conventional transmitter and receiver technologies to produce an RF transponder. The power conserving portion of the circuitry would be included at least in the section containing the S.O.

According to the present invention, a reference frequency may be transmitted as the incoming signal on the line 14 from a transmitter source at a fixed power level over a distance to the transponder 10. The signal level is weakened as it propagates through the signal path. The farther the signal travels, the weaker it becomes and approaches a limit in range due to the sensitivity of the transponder. The weakened signal must then be amplified to a level appropriate for purposes of detection or demodulation. This amplification process requires power consumption which is proportional to the amount of signal gain required.

In the prior art, a typical signal amplifier used for this purpose is a stable linear amplifier device that reproduces the input signal at the output with greater amplitude while minimizing distortion and or noise. This is achieved at the cost of power consumption from the power source. Linear amplifiers inherently consume a continuous minimum amount of power partly by the fact that a bias network is properly adjusted to keep the amplification device in its linear region of operation. Different types of amplifiers can be made in relation to the way they are biased. For example, a bias network can be designed to keep an amplification device at a point of low power consumption for a portion of the period of the input frequency. This technique allows for lower average power consumption at the cost of momentarily placing the amplifier device into a region of operation that is not linear therefore introducing distortion products. Signal distortion is typically an undesirable quality.

A completely different device, i.e., the above-mentioned synchronous oscillator (S.O.), is an oscillator that is periodically injected with an input signal that produces an output signal that has a specific time relationship to the input signal's frequency and/or phase. This is accomplished by an oscillator circuit that can accept an input a signal to synchronize the output signal of the oscillator. The oscillator design is one where the synchronizing input signal can be removed for a period of time but the output signal of the oscillator runs as if the last injected signal were still present. The output of the oscillator will continue to run at this rate for a period of time before needing an updated input injection signal to keep going. Maximizing the power efficiency of the oscillator circuit may require circuit devices to be placed in an operating region temporarily where the power consumption will be minimized, and input injection signals cannot synchronize the oscillator output signal. The oscillator circuit however will continue to run at an operating frequency, and the output signal will simply diminish from the removal of stored energy from a resonant circuit. If the resonant circuit energy is periodically replenished with enough energy to replace energy that was lost, the output signal from the oscillator may not diminish. If an input injection signal to the oscillator is at a level lower than the oscillator output signal, the synchronized oscillator circuit will appear to have signal gain from the input to the output. A classic signal amplifier circuit will lose the output signal as soon as the input signal is removed. The method described to use an oscillator circuit to provide signal gain can be implemented in a wide variety of ways. The synchronous oscillator circuit shown in FIG. 13 is an example of a circuit that has signal gain while maximizing the power efficiency. Many other circuits can be developed that have the characteristics of a low power consumption synchronous oscillator as described.

Further describing the details of an S.O., as described above, the S.O. output signal synchronizes to the input signal during the input signal injection time. When the injection signal is removed, the S.O. will continue to run at the injected signal's frequency for some number of cycles. This time is called the storage time of the S.O. and is dependent on the injection level and other parameters specific to the design of the individual S.O. The storage time is typically long enough that many cycles of the input signal may pass without the S.O. needing to be refreshed by an input signal injection. The periodic injection allows the S.O. to consume less power than a device that is injected continuously. Power is consumed at a higher level during the signal injection time, due to the fact that the devices used to construct the S.O. are placed in a higher power consumption operating region during the injection period. Minimizing the injection time while providing an acceptable S.O. output signal in relation to the input signal, will reduce power consumption. The injection time is controlled by the specific design of the S.O. circuit. The injection time of the S.O. as shown in FIG. 13 is the portion above the t-axis of each period shown in FIG. 14 as the linear region. Other S.O. designs (not shown) may have more or less injection time, and will become a design tradeoff to those skilled in the art of designing S.O. circuits. Circuit configurations other than shown in FIG. 13 may be used to construct an S.O. as long as they preserve the desirable qualities of an S.O. as described. The output of the S.O. will synchronize to the input signal over a limited frequency range referred to as the lock range. The output of the S.O. operates at a fairly constant level over the lock range. A much lower level signal is injected into the input of the S.O. to sustain synchronization between the input and output signal. The difference in level between the output and input is directly associated with the gain of the S.O. stage. If the input signal is lowered beyond the S.O. stage's ability to sustain synchronization or is completely removed, the S.O. will eventually run at its natural frequency of operation, which is typically close but not necessarily the same as the injected frequency. The injected input frequency may also be a multiple or submultiple of the output frequency as long as there remains a distinct periodic relationship between the input and output signals. It should be mentioned that the tank circuit L, C2, C3 of the S.O. such as that shown in FIG. 13 or any other resonant circuit of any other oscillator being used can be electronically tuned for various purposes.

According to the present invention, a synchronous oscillator (S.O.) can be used for its amplifying characteristics, either directly or in a modified form to provide the functions required to make the receiver 16 of FIG. 12(*a*), an acceptably sensitive receiver with low power consumption. This can be done by means of one or more synchronous oscillators (S.O.), as shown in FIG. 12(*a*). Cascading the S.O. stages will increase the overall signal gain of the receiver as shown in FIG. 15. The overall signal gain reaches a maximum practical limit and is dependent on the characteristics of the individual S.O. stages. The receiver in general accepts a low level signal plus noise from the antenna system and must supply enough signal gain to yield an output signal with an acceptable level and signal to noise ratio.

It should be mentioned that a synchronous oscillator is an oscillator and a nonlinear network element, yet it performs linear signal processing, according to the present invention, at a low level of power consumption. A synchronous oscillator tracks an injected input signal in frequency and phase, while providing signal amplification at a lower power consumption rate than equivalent-gain linear amplifier networks. An off-the-shelf high performance low noise amplifier may have 20 dB of gain while consuming 50 milliwatts of power. The synchronous oscillator, according to the present invention, may have 40 dB of gain while consuming only 1 milliwatt of power. In this example, for equal amounts of gain, the synchronous oscillator consumes about 100 times less power.

The synchronous oscillator has other desirable features that can be applied for instance to the transponder receiver 16, according to the present invention. The first feature is that it provides frequency filtering. The built-in filtering characteristic of the synchronous oscillator reduces the requirement of conventional filters being used in the receiver. This saves cost due to the reduced parts count and does not require the amplifier stages to overcome filter losses. The quality of the filtering is comparable to conventional designs.

The skirt selectivity of the filtering characteristic defines the attenuation of signals outside the passband of the filter. The skirt selectivity of the synchronous oscillator has been shown to be better than a conventional three-section filter, as shown in "The Synchronous Oscillator: A synchronization and Tracking Network" by Vasil Uzunoglu et al, IEEE Journal of Solid-State Circuits, vol. SC-20, No. 6, Dec. 1985.

Another feature is that the device can lock or amplify a desired signal very quickly after it is applied. This feature can be important in a transponder receiver section if the unit is turned on and off to conserve power. A minimal amount of on time would conserve the most power. Conventionally designed receivers can suffer turn-on delays due to the turn on times of local oscillators. A crystal controlled local oscillator may take several milliseconds to turn on, where a synchronous oscillator can turn on and lock in hundreds of nanoseconds.

Furthermore, the synchronous oscillator can be modified to produce frequency translation, according to the invention. If a radio transponder is required to operate with an output frequency that differs from the input frequency, the frequency converting stage can take advantage of the ability of the synchronous oscillator to lock to integer and noninteger frequency multiples as described in U.S. Pat. No. 4,356,456, in "The Synchronous Oscillator: A synchronization and Tracking Network" by Vasil Uzunoglu et al, IEEE Journal of Solid-State Circuits, vol. SC-20, No. 6, Dec. 1985, in "Some important properties of Synchronous Oscillators", by Vasil Uzunoglu et al, Proceeding of the IEEE, Vol. 74, No. 3, March 1986, in "Synchronous and Coherent Phase-Locked Synchronous Oscillators: New Techniques in Synchronization and Tracking" by Vasil Uzunoglu et al, IEEE Transactions on Circuits and Systems, Vol. 36, No. 7, July 1989, and in "Theoretical Analysis of a Coherent Phase Synchronous Oscillator" by Marion Tam et al, IEEE Transactions on Circuits and Systems, Vol. 39, No. 1, Jan. 1992.

As shown in FIG. 13, one or more of the S.O.'s of FIG. 12 can comprise an S.O. 22 with a Colpitts Oscillator having a transistor Q1 and with an external signal such as the signal on the line 18 injected into the S.O. 22 via a transistor Q2. The transistor Q2 injects current into the Colpitts oscillator and provides a sink for the transistor steady state emitter current, since the transistor Q1 does not have a return path through ground. Transistor Q2 becomes an active emitter load for the Colpitts oscillator. The transistor Q2 appears to be a narrow band filter to the transistor Q1 at the center frequency of the synchronous tracking receiver. The coil L typically has a Q of less than one hundred (100). The effective Q of the Colpitts oscillator, as seen by a signal injected into the transistor Q2, is on the order of ten thousand (10,000) or greater. The apparent very high Q of the Colpitts oscillator is generated because the Colpitts oscillator is a regenerative circuit. In effect, the signal is recirculated until the Colpitts oscillator approaches saturation. Each time the signal recirculates, the effective Q of the circuit is multiplied by the actual circuit Q.

Figure 14:
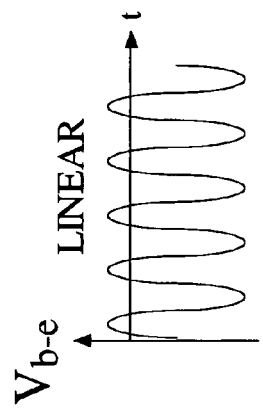
FIG. 14 shows the voltage of the base-to-emitter junction of the transistor of the Colpitts oscillator of FIG. 13.

The base-emitter voltage ($V_{b-e}$) across Q1 is shown in FIG. 14. When the junction is forward biased, placing it in the linear operating region, the oscillator output is phase modulated by the input signal on the line 18 through the transistor Q2. The Colpitts oscillator includes the transistor Q1, a RF coupling capacitor C1, the coil L and a pair of capacitors C2 and C3. The combination of devices L-C2–C3 form a tank circuit located above Q1 that sets the free-running frequency of the S.O. 22. The path created by C1, the connection between the emitter of Q1 and the node between C2 and C3, as well as the transistor Q2, introduce a set of positive and negative feedback paths that allow oscillations to exist. The Colpitts oscillator is isolated by a radio frequency choke Lc. The choke also could be another type of isolation device, such as a resistor or in some instances may not be required. The transistors are direct current biased by a bias network to be in the linear region.

The bias may be set to minimize current consumption until an input signal on line 18 is present. This is accomplished by biasing the transistor Q2 just below the active region or in cutoff. An input or injected signal will drive the transistor Q2 out of cutoff and back into the active region. This will minimize current consumption when no signal is present.

It will be understood by anyone skilled in the art that the discrete and active components have different characteristics over frequency and that their equivalent circuit model will change. As the frequency range increases, smaller valued capacitive and inductive components have larger reactances. The circuit model may also become more complicated as impedances that can be ignored in lower frequency models become more dominant at the higher frequencies. The use of discrete components at higher frequencies may not be possible due to parasitic reactances that may interfere with proper operation of the circuitry. As will be evident, this may require the designer to use microstrip, stripline or other technologies to construct the circuitry and have it work properly for a particular application.

Figure 15:
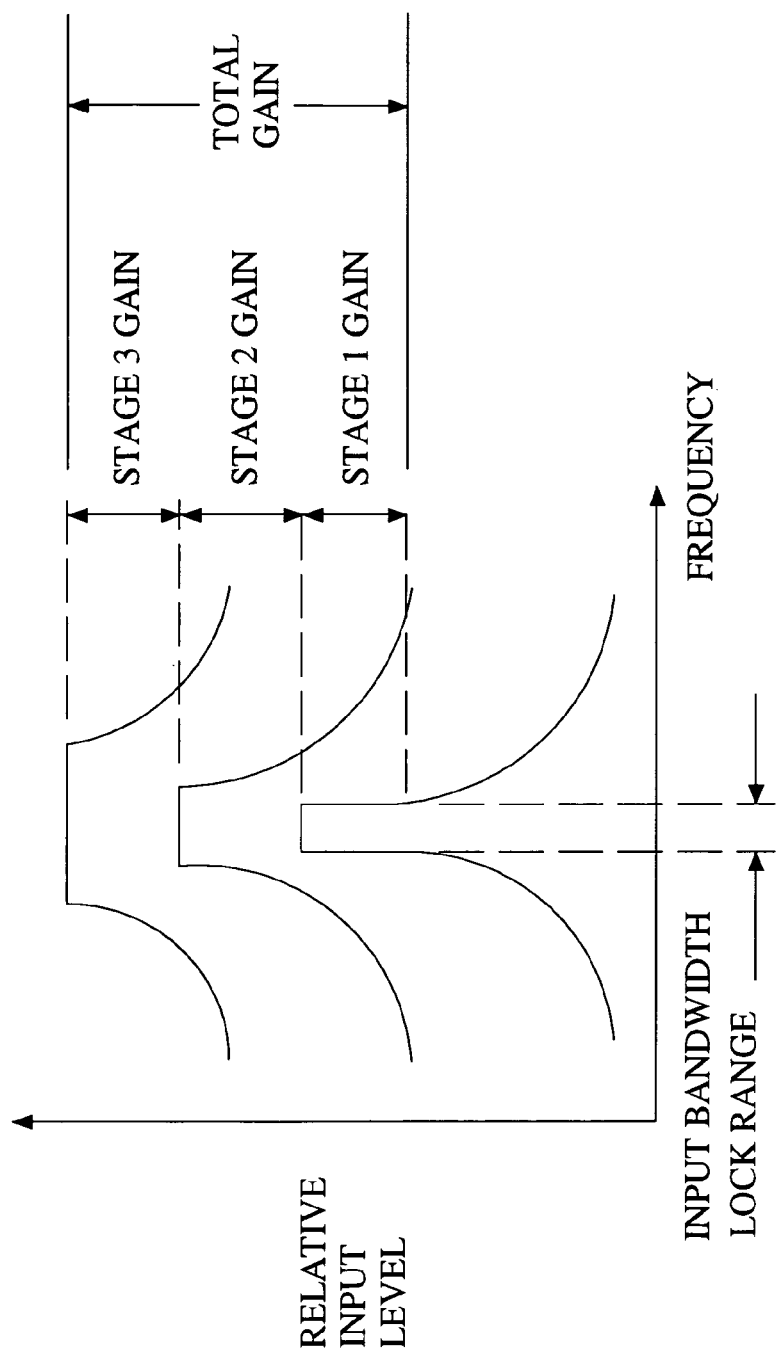
FIG. 15 shows the way in which a transponder according to FIG. 12(a) can be sensitive to an input frequency range having a narrow bandwidth, and by cascading stages, providing an overall gain greater than a single stage.

FIG. 15 shows how the various gain factors of the three-stage S.O. (22, 24, 26) example of FIG. 12(a) become additive in amplifying the input signal on the line 28cb. The first stage 22 is responsive to the input signal occupying a relatively narrow input bandwidth, as shown. It amplifies the input signal level to a higher level using the Stage 1 gain factor. The output of Stage 22 is provided as an input to Stage 24, which has its own Stage 2 gain. This Stage 2 gain adds to the Stage 1 gain and has a wider input bandwidth which must respond, due to the properties of the synchronous oscillator of Stage 1. Similarly, the second Stage 24 provides an output signal as an input to the third Stage 26, which has a still wider frequency bandwidth presented thereto. Stage 3 adds its gain to the total gain applied to the input signal on the line 28cb, so that the intermediate signal on the line 28bd has been amplified considerably, as shown by the relative input level increase of FIG. 15. A range of frequencies as determined by the input bandwidth of the first stage is therefore made available to the transmitter for use in providing the output signal on the line 28da.

If frequency translation is required and the previously mentioned methods utilizing an non-modified S.O. are undesirable because of the limited number of input/output frequency combinations, there is another solution that requires a small modification to a S.O. according to the present invention. Instead of the S.O. locking to a frequency multiple or submultiple, the creation of a new non-related frequency can be made, and mixed with the injection frequency of the S.O. To accomplish this, a mixing process is performed within the S.O. stage. The synchronous oscillator operates with non-linearities by placing the Colpitts oscillator into a non linear operating region as shown in FIG. 14. The input of the S.O. is also switched to accept signals during the linear operating region of the Colpitts oscillator which is a portion of the cycle at the rate of oscillation determined by its resonant network. These characteristics can be utilized to produce frequency mixing. This mixing function will create new output frequencies based on the input frequencies. Mixed products of the input frequencies may be used to lock the S.O. The non-modified S.O. can only synchronize to input signals that are periodically related to the S.O. output frequency. Input signals to the S.O. that do not cause the S.O. to properly synchronize, will frequency beat or heterodyne and create mixed products determined by the operating frequency of the S.O. and the injected input frequency. To frequency heterodyne two or more signals, one of the frequencies injected into the S.O. can be used as the signal that is within the lock bandwidth of the S.O., while the other signal is outside the lock bandwidth. Frequencies at the output of the S.O. are products of the input signals, where one input signal is effectively frequency translated by the other input signal. This technique of translating carrier frequencies is known as superheterodyning, usually abbreviated to "superhet." The purpose of this translation is to allow further amplification of the desired signal at a carrier frequency convenient for circuit design. Typically, superhet receivers provide improved rejection of unwanted signals. In the transponder application here, the translation would allow a different reply frequency than the injected input frequency to the transponder.

Figure 16:
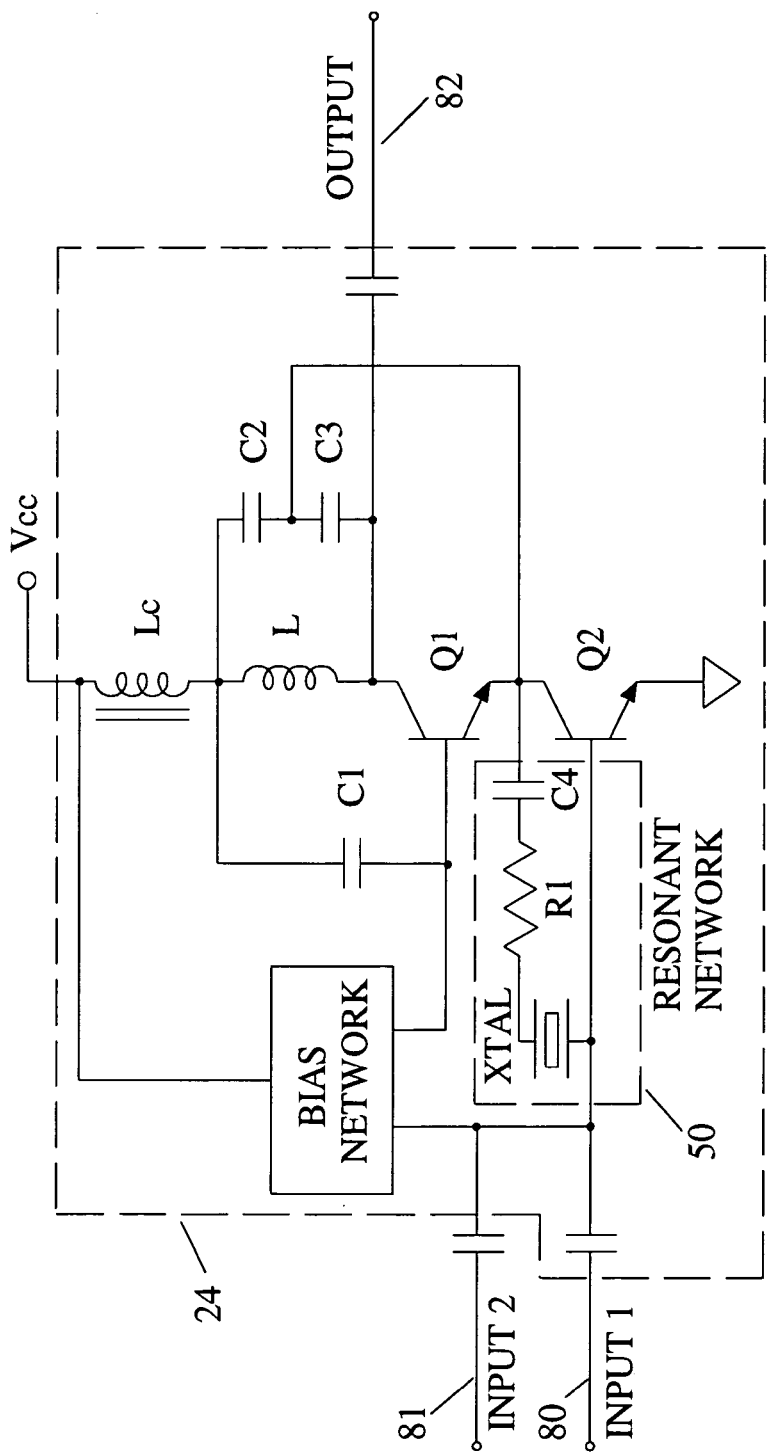
FIG. 16 shows a synchronous oscillator such as that shown in FIG. 13, except modified to have multiple inputs and an internal feedback loop comprising a crystal oscillator.

A modification can be made to the circuit of FIG. 13, to allow injection first of the operating frequency of the S.O. along with a second injected frequency. The modification is performed for the purpose of allowing the two or more input signals to heterodyne or frequency mix. The modification is shown in FIG. 16, and performed by simply adding another input 81 in parallel to the existing S.O. input 80 at transistor Q2. One input will be used to lock the S.O., while the other input will be used to inject the frequency that is desired to be heterodyned with the S.O. operating frequency. Frequency Fso can be injected at input 1 on the line 80 to lock the synchronous oscillator 24. Frequency F1 can be injected on a second input on the line 81 for the purpose of heterodyning with frequency Fso. The output of stage 24 on a line 82 will contain the frequency mixed components of the two input signals Fso and F1.

FIG. 16 also shows a modification of the synchronous oscillator of FIG. 13, in which a resonant network 50 has been added between the collector and base of transistor Q2. This feedback path provides, for instance, an oscillator, such as a 20 MHz oscillator, within the Synchronous oscillator of FIG. 13. The frequency of resonant network 50 will heterodyne with the operating frequency of the S.O. creating an output with frequency difference signals corresponding to the frequency of the crystal added and subtracted from the operating frequency (F) of the Colpitts oscillator. This is shown in FIG. 17 as F−XTAL and F+XTAL.

FIG. 18 shows the feedback oscillator circuit of FIG. 16 in isolation. FIG. 19 shows the same concept shown in FIG. 18, except as a generalized resonant network or a plurality of such resonant networks connected in other ways, as suggested by another resonant network 52 in phantom lines connected between the base and the emitter of Q2.

FIG. 20 shows that a synchronous oscillator stage can be responsive to various inputs, including external inputs 1 on line 80 and external input 2 on line 81, as well as a modulation input on a line 90. The modulation input 90 electrically alters the resonant network 50 and can do so through a wide variety of implementations. The output frequency is translated by heterodyning techniques by injecting a signal or a plurality of signals into inputs 1 and 2. The output frequency is translated by the operation of an oscillator comprised of the resonant network 50 at the location of transistor Q2. Frequency Modulation (FM) or phase modulation (PM) with a bandwidth within the lock range of the S.O. can be introduced at the output 82 by injecting the modulation signal into inputs 1 on line 80 and/or input 2 on line 81. FM or PM signals with bandwidths greater than the S.O. lock range can be introduced on inputs 1 and or 2 as long as one of the inputs is used to lock the S.O. If one input does not lock the S.O., any applied inputs would simply heterodyne with the free running S.O. frequency. Modulation bandwidths that are not restricted by the lock range of the S.O. may be introduced by electronically altering the resonant network 50 by injecting a modulation signal on the line 90.

A radio frequency tag is a device that is attached to something to identify, classify, or label it. The tag information is conveyed to an interrogator unit by wireless radio frequency means. The transponder of FIG. 12, can be applied as a radio frequency tag, and will now be described in detail in connection with FIG. 12(a), with three stages of synchronous amplifiers 22, 24, 26 acting in different modes. Although the transponder can be configured with more or less stages, an example will be useful to show different uses for the synchronous amplifier stages. The stages in the transponder can be compared to the stages in a conventional radio receiver because the signals in the stages of a conventional radio receiver are similar to signals in the stages of a transponder. A conventional radio receiver that produces an audible output contains radio frequency stages that have specific functions. An example of a common radio receiver contains four different stages to receive a radio signal and produce an audio output. The function of the first stage is to amplify the receive signal captured from an antenna. The function of the second stage is radio tuning with a local oscillator and a heterodyne mixer circuit. The second stage frequency translates the amplified receive signal from stage one to a specific frequency that a third stage operates at. The function of the third stage is to filter undesired signals and is optimized to work at a specific frequency that is output from the second stage. The function of the fourth stage is to detect the audio signal present on the frequency converted and filtered radio frequency signal and produce an audible output. The transponder described does not produce an audio output so a stage performing the function of the fourth stage as described above is not required. The filtered frequency output from the third stage described above will be used as the transmit signal in the transponder. In the transponder, S.O. stage 22 will be used as the first stage and will function as an amplifier for the received signals captured from the receive antenna. FIG. 13 shows the S.O. 22 in detail. This is similar to the first stage 22 shown in FIG. 21 which is shown to be an amplifier for the frequency F1. S.O. stage 24 of FIGS. 12(a), 16, and 21 will be used as the second stage which will frequency translate the signal from stage one to a desired transponder transmit frequency via the use of a local oscillator and heterodyning mixer. S.O. 22 as shown in FIG. 13 has one input 18. In order to heterodyne two or more signals by an S.O. stage, it is required to inject the two or more signals into the stage. If one of the mixing signals is generated locally in the S.O. stage, the other heterodyne mix signal is injected on the input to the S.O. stage requiring only one input. The signal generated locally and the signal externally injected would heterodyne and produce mixing products on the output of the S.O. stage. If no signals are generated locally to the S.O. stage, the signals that are to be heterodyned are injected externally to the S.O. stage as shown in FIG. 16 requiring an input for each different signal. This will require the S.O. stage to have available more than one input to accommodate the different injected signals. FIG. 16 shows the additional input and a resonant network 50 of S.O. 24 as compared to S.O. 22 of FIG. 13. The S.O. 24 is a modified version of S.O. 22 adding inputs 80,81 to make the S.O. 24 more flexible in use for inputting signals used for modulation and frequency conversion. S.O. stage 24 also has the capability of generating a signal locally through the use of a resonant network 50. This stage is similar in operation to the stage 24 shown in FIG. 21. By using a crystal resonator 50 in the feedback path (such as in FIGS. 16 and 18) on the input transistor Q2, the output will contain F1, the mix frequencies F1+Fxtal and F1−Fxtal. The LC network L-C2–C3 will still be tuned to F1. The resonator in S.O. 24 can be implemented with other devices besides a quartz crystal, as suggested by FIG. 19. A simple L-C network can be used as the resonator. Electrically tunable elements can be incorporated for the purpose of modulation which is not used in this example. S.O. stage 26 will be used as the third transponder stage and will filter any undesired signals from the second stage, S.O. 24, and output the filtered signal to the transmit antenna. S.O. 26 has the same structure as S.O. 22 of FIG. 13. As shown in FIG. 21, to filter the unwanted frequency components the final output stage 26 will be used as a single sideband filter by tuning the LC network L-C2–C3 to F1+Fxtal. Referring back to FIG. 12(*a*), the transponder is built by taking the configuration of FIG. 21 and adding antennas 28*a*, 30*a* and applications 28*c*,28*d* (either or one of which could be a mere node). The transponder will track input frequency F1 captured by antenna 28*a* and will reply on the line 28*bd* and on the line 28*da* with F1+Fxtal. The signal on line 28*da* is injected into the transmit antenna 30*a*. The antenna 30*a* in turn provides the outgoing radio frequency signal on the line 12. If the transponder application required modulation to be introduced, this would be possible through the use of application 34*e* on a line 34*eb*. Placement of a modulator in the transponder radio frequency chain is dependent on several factors. One factor is the type of modulation and another is its bandwidth. The transponder can be made to reply with Amplitude modulated (AM), FM, PM or spread spectrum signals.

For FM or PM modulation processes, if the modulation bandwidth is within the tracking range of the S.O., the modulator can be placed in between stages. For FM or PM modulation bandwidths less than or equal to the locking bandwidth of the synchronous oscillator stage, the modulation may injected as shown in FIG. 22. An external modulation signal (Fe) is injected on a line 81 into stage 24 by an external modulated source. The heterodyning process produces an output spectrum on a line 82 containing the mixed products from the input frequency F1 on a line 80 and the modulation signal at frequency Fe on the line 81. Stage 26 is used as a filter tuned to the desired output signal at frequency F1+Fe on the line 83.

If FM or PM is utilized, and the modulation bandwidth is greater than the S.O. tracking range, the modulator is placed on the output of the final S.O. stage. This is required since the S.O. cannot track the wider bandwidth modulation signal.

If an amplitude modulator is desired, it must only be at the output of the S.O., and not in between S.O. stages, since the S.O. will convert the AM information to a PM signal.

An example of a modulator placed on the output of a synchronous oscillator is shown in FIG. 23. The output signal F1 on a line 40 from stage 22 is injected into a modulator 60. A modulating signal is provided on a line 64. The output of the modulator 60 on a line 66 will contain the spectrum of the original input signal F1 on line 18 modulated by the modulating signal on the line 64. A Filter 62 removes undesired signals from the frequency spectrum on the line 66 and outputs the filtered spectrum on a line 68. Since the modulator 60 is on the output of stage 22, any modulation technique may be used to modulate carrier F1 on the line 40 by the modulating signal on the line 64.

Figure 24A:
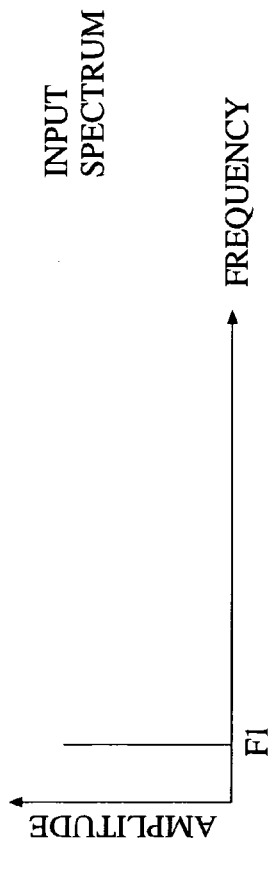
FIG. 24(a) shows an input frequency F1 that will be heterodyned with a synchronous oscillator operating frequency for the modified synchronous oscillator shown in FIG. 20.
Figure 24B:
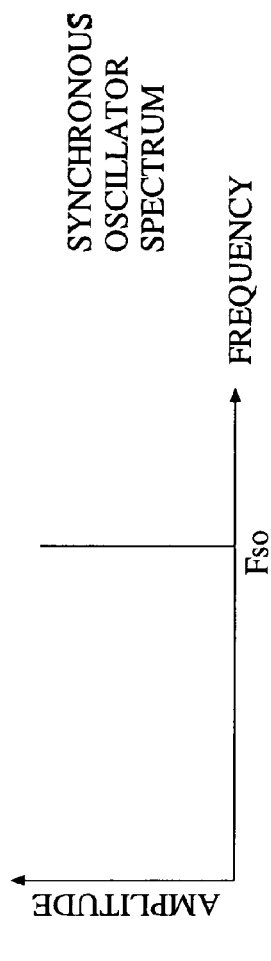
FIG. 24(b) shows the operating frequency of a synchronous oscillator.
Figure 24C:
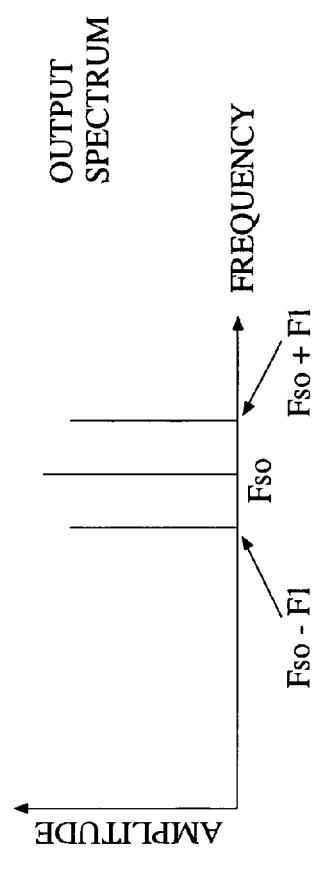
FIG. 24(c) shows the output spectrum of a synchronous oscillator that has heterodyned the frequency F1 of FIG. 24(a) with the operating frequency of the synchronous oscillator shown in FIG. 24(b).
Figures 25A, 25B, 25C:
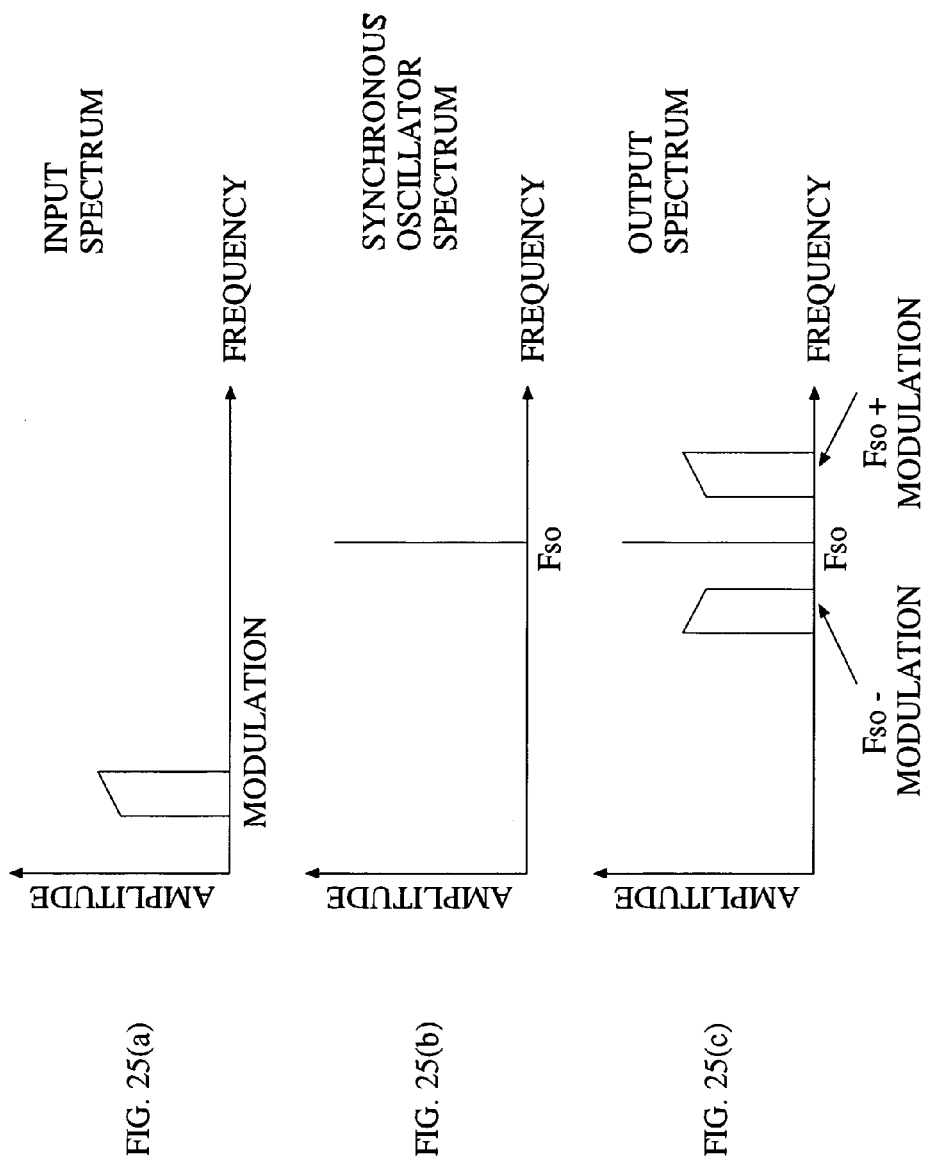
FIG. 25(a) shows an input modulation signal that will be heterodyned with a synchronous oscillator operating frequency for the modified synchronous oscillator shown in FIG. 20.
FIG. 25(b) shows the operating frequency of a synchronous oscillator.
FIG. 25(c) shows the output spectrum of a synchronous oscillator that has heterodyned the modulation signal of FIG. 25(a) with the operating frequency of the synchronous oscillator shown in FIG. 25(b).

FIGS. 24 through 26 show different examples of the mixing process with different types of signals. FIG. 24(*a*), shows the frequency spectrum of an input frequency F1, e.g., on the line 81 in FIG. 16. FIG. 24(*b*) shows the frequency spectrum of an operating frequency Fso on the line 80 of the modified S.O. 24 as shown in FIG. 16. As shown in FIG. 24(*c*), sums and differences of the two input frequencies F1 of FIG. 24(*a*) and Fso of FIG. 24(*b*) will be produced through the mixing process and will appear at the output of the S.O. on the line 82 as shown in FIG. 24(*c*). In this case, the mixing frequency F1 is generated externally to the modified S.O. mixing stage.

As described above, the mixing effect can also be used to modulate the S.O. with information. Spectral details of this will be shown in FIGS. 25(*a*), 25(*b*) and 25(*c*) which share a common frequency axis. As above, the S.O. will be modified to have more than one input. One input will be used to lock the S.O., while the other input will be used to inject the modulation that is desired to be heterodyned with the S.O. operating frequency Fso. The S.O. lock signal can be provided as an input on line 80 of FIG. 16 and is shown in FIG. 25(*b*). Thus, FIG. 25(*b*) shows the frequency spectrum of the operating frequency Fso of the modified S.O. 24 of FIG. 16. An externally generated source may be modulated with information and injected into the modified S.O. 24 shown in FIG. 16 on the line 81. The frequency spectrum of the modulation can be seen as an example in FIG. 25(*a*). As shown in FIG. 25(*c*), the mixed products of Fso of FIG. 25(*b*) and the modulation of FIG. 25(*a*) will appear at the S.O. 24 output on line 82 as Fso, Fso−MODULATION, and Fso+MODULATION.

The mixing frequency F1 shown in FIG. 24(*a*), can also be generated internally to the modified S.O. mixing stage. A generalized resonant circuit 50 as shown in FIG. 19, can be added as a feedback path in the modified S.O. input stage to make it oscillate at a rate determined by the resonant circuit. Placement of the resonant network is dependent on the type of network and is determined by the actual design. An example of the placement of the resonant networks is shown in FIG. 19 as resonant network 50 and 52. A quartz crystal as shown in FIG. 18, can be used as the resonant network. A resistor and capacitor are placed in series with the crystal to provide A.C. coupling and to control the drive level to the crystal. The resonant circuit may also contain electrically tunable reactive devices. These components may be used to alter the circuit frequency or phase. This can be used to produce a modulated signal that contains information. The mixing function can produce a modulated output frequency. A modification to the resonant circuit 50 of FIG. 16 can allow modulation signals to be introduced to the input of the modified S.O. 24 of FIG. 16. For instance, the capacitor C4 placed in series with the crystal XTAL as shown in FIG. 16, can be replaced by a varactor diode for electronic tunability. By altering a bias voltage on the varactor diode, the capacitance value of the varactor diode will vary causing the resonant frequency of this modified resonant circuit to change, therefore effectively modulating the output.

This internally generated local oscillation frequency can replace the previously-mentioned externally provided mixing frequency F1 of FIG. 24(*a*).

A combination of the external and internally generated oscillator frequencies can be configured. This will produce many mixed products, but may be beneficial to a specific design. The inputs used in the mixing function can also be modulated with information. The modulation can be provided externally to the modified circuitry or can be incorporated into the internal feedback network.

As an example, an externally modulated signal and a local oscillator signal will be mixed with the operating frequency of a S.O. The modified S.O. 24. of FIG. 16 will be used in this example. A frequency Fso is injected on the line 80 for the purpose of locking the S.O. 26. FIG. 26(*b*) shows the frequency spectrum of the operating frequency Fso of the modified S.O. 24. An externally generated modulation signal is injected on the line 81. A local oscillator signal F1 is generated internally to the S.O. by a resonant network 50 comprised of XTAL, R1 and C4. FIG. 26(a) shows the frequency spectrum of the locally generated F1 and the externally generated modulation. FIG. 26(c) shows the output frequency spectrum on line 82 generated by mixing the frequency Fso with the frequency F1 and the modulation. As can be seen in FIG. 26(c), the modulated spectrum is frequency translated by the frequency F1 above and below Fso. Varying the frequency F1 will therefore allow positioning of the modulated signal in the output frequency spectrum.

If it is desired to generate the frequency F1 externally to the S.O., and frequency mix with the modulation as in the example above, the S.O. of FIG. 16 can still be used. The S.O. of FIG. 16 is shown with two inputs, input 1 on the line 80 and input 2 on the line 81. Multiple signals may be injected on any input. In this example, Fso is injected on the line 80 for the purpose of locking the S.O. An externally generated F1 and an externally generated modulation are injected together on the line 81. The concept of injecting multiple signals on an input line is equivalent to simply adding more inputs to the S.O stage.

To have multiple interrogator and tag pairs working in the same environment, it is necessary to separate them in some manner so the different units do not interfere with each other and the proper tag responds to the appropriate interrogator. This can be accomplished in many ways with techniques involving time, frequency, waveform coding, directional antennas, or other techniques not given in detail herein. Separation of the interrogator and tag pairs in the frequency domain is probably the simplest to implement, but will be limited by the number of pairs able to occupy a frequency spectrum in an environment.

When the transponder tag described above and an interrogator (not shown) are used in a system, there will be a frequency allocated bandwidth that the devices can operate in. A possible operating frequency range may be the FCC allocated Industrial Scientific Medical (ISM) band at a frequency range of 902 to 928 MHz. This band provides up to 26 MHz of bandwidth to be used by the transponder and interrogator devices. A typical S.O. operating range is on the order of a few hundred Kilohertz. The transponder frequency can be designed to work within the ISM frequency limits. By taking into consideration the S.O. operating range and that the operating frequency can be individually adjusted on each transponder and interrogator device, allows for a limited number of unique operating channels that the devices may work in without conflict or interference. A channel is a relatively narrow frequency range that a device may operate in which located inside a larger frequency range which could contain a number of channels. The number of unique channels can be determined by taking the allocated bandwidth and dividing it by the bandwidth utilized by each interrogator and transponder pair. If the bandwidth utilized by each interrogator and transponder pair is equivalent to the S.O. operating bandwidth, then it will be on the order of a few hundred Kilohertz. As an example 1f the S.O. operating bandwidth is 500 kilohertz, and the operating channels contained no amount of frequency space between them, you could occupy 52 (26 MHz/0.5 MHz) unique frequency channels in the ISM band.

The allocated band will typically have greater bandwidth than the S.O. input or lock range bandwidth. Device and circuit tolerances along with environmental conditions such as temperature may make it difficult for a tag with a temperature-unstable LC resonant network to consistently operate at a specified frequency. The input bandwidth of the tag as compared to the allocated interrogation/reply bandwidth will create a large number of operating channels inside the given bandwidth. To ensure reliable interrogation and tag replies, it may be necessary to tune either the interrogator to the specific tag frequency or vice-versa. To accomplish this the tag LC tank or resonator networks can be tuned or the interrogator can tune through all the tag frequency channels. The S.O. will also track signals with a low carrier to noise ratio. This feature can allow receivers in different frequency channels to be interrogated simultaneously with one wide band noise source. This will occur as long as the noise signal contains the frequency components necessary to allow the lock operation of the S.O. The locked S.O. will track the noise components inside the lock bandwidth.

The purpose of utilizing receiver configurations as shown in FIG. 2, is to support a specific application 2c, 2d. In an example, as shown in FIG. 27, an application 2d5 decodes a control signal 2bd (see FIG. 2) and operates a switch. The control signal is comprised of two unique states. Each state is represented by a different frequency. The transmitted control signal allows the controlled switch to have two states, the switch being open, and the switch being closed. A frequency Fon may be transmitted as the control signal used to close a switch. Another frequency Foff may be transmitted as the control signal used to open a switch. The transmitted control signal is captured by the antenna 2a of FIG. 2 and injected on line 2ac to the input of the S.O. 2b on the line 2cb where the application 2c is in this case an electrical node. The S.O. 2b locks to the control signal and amplifies the signal to an acceptable output level on the line 2bd. The application 2d5 contains a detector circuit connected to line 2bd that detects and discriminates between the frequencies Fon and Foff. The detector output is provided to a switch control that controls the position of the switch depending on the frequency detected being Fon or Foff. In this example the output signal on the line 2e of FIG. 2 can be viewed as the control signal that controls the switch of FIG. 27 in the on or off position.

In another application similar to the one shown in FIG. 27, the switch control signal used may have more than two states. Each state may be represented by transmitting different sequences of frequencies. As an example, using two unique frequencies, each representing an opposite binary value, allows many states to be represented. A frequency Fzero may be used transmitted as a control signal representing a binary value of zero. A Frequency Fone may be used as a control signal representing a binary value of one. A sequential transmission of a combination of frequency Fone and frequency Fzero will represent a certain state determined by the sequential binary values that the frequencies represent. The application detects, discriminates and decodes the binary values to represent different states. In an example, four switches labeled SW1 through SW4 are controlled to allow only one switch in the four to be closed. This is accomplished by transmitting different combinations of frequency Fone and frequency Fzero. SW1 will be controlled to close by the transmission of frequency Fzero followed by another transmission of frequency Fzero. SW2 will be controlled to close by the transmission of frequency Fzero followed by a transmission of frequency Fone. SW3 will be controlled to close by the transmission of frequency Fone followed by a transmission of frequency Fzero. SW4 will be controlled to close by the transmission of frequency Fone followed by another transmission of frequency Fone.

This technique using common binary methods may be expanded to represent an almost unlimited amount of states.

In another application 2d6 utilizing analog methods, as shown in FIG. 28, an infinitely variable amount of states can be created. A transmit frequency is selected by means of linear interpolation to represent a linear change of voltage. As an example, a frequency between a frequency Fzero and a frequency Fone is transmitted to represent an analog voltage between zero and one. The application detects and discriminates the frequency transmitted and will produce a voltage between zero and one by linear interpolation. If the frequency transmitted is exactly between the frequency Fzero representing zero volts and frequency Fone representing one volt the detector output through linear interpolation will produce one half of one volt. In still another application 2d7, as shown in FIG. 29, the signal received by wireless means can also contain information such as in a video or audio transmission. The application would need to contain the proper demodulation circuitry for the method being used to modulate and transmit the information. For example, if data is transmitted through the technique of phase modulation, the application would need to contain the proper phase demodulation circuitry to properly recover the original data.

The purpose of utilizing transmitter configurations as shown in FIG. 3 is to support a specific application such as a tire pressure measurement and reporting application shown in FIG. 30. The application shown in FIG. 30 is one where the reporting signal being transmitted by the antenna 3a is a sensed signal on a line 3e representing air pressure. An air pressure sensor located for instance inside a tire measures air pressure as indicated on the line 3e and provides an output signal having a magnitude indicative thereof. The application of measuring an air pressure signal 3e is accomplished by injecting into the S.O. a usable signal on a line 3cb from an application part 3c5 that includes the sensor. An air pressure sensor that has the characteristic of changing its capacitive value with air pressure may be used as a resonant element in an oscillator (OSC) also included the application part 3c5 to produce such a useable signal 3cb as shown in FIG. 30. As the capacitance value changes, the resonant frequency of the oscillator (OSC) also changes. The oscillator output signal on the line 3cb is injected from the application part 3c5 into the S.O. 3b. The application part 3c5 may also inject a controlled frequency reference signal on the line 3cb into the S.O. 3b to lock the S.O. frequency but this is not necessary if the stability of a free running S.O. is acceptable. The S.O. frequency mixes with the oscillator signal from the application part 3c5 and creates frequency sidebands. The output signal from the S.O. on line 3bd is injected into the antenna 3a by signal line 3da5 where an application part 3d5 is merely an electrical node with the signal 3bd as an "input" and the signal 3da5 as an "output." If a linear change in the resonant frequency of the oscillator operating from the air pressure sensor occurs from a comparable linear change in air pressure, the receiver capturing the transmitted reporting signal can determine the air pressure value by means of linear interpolation by measuring the frequency of the sideband signal. A simpler form of circuitry would involve integrating the air pressure sensor application part 3c5 into the S.O. 3b, eliminating the need for a separate oscillator (OSC). For instance, a capacitive air pressure sensor could replace a capacitor such as the capacitor C4 in network 50 shown in one of the S.O. examples previously (see FIG. 15, for instance). As mentioned above, if the frequency stability of a free running S.O. is acceptable, the application part 3c5 does not need to inject a controlled frequency reference signal into the S.O. 3b to cause frequency lock. As also previously described, the air pressure may be determined in the receiver by linear interpolation.

In another application example, a wideband phase modulated signal is transmitted. The signal bandwidth is greater than can be injected into the S.O. 3b stage so the modulation process takes place on the outside the S.O. An example of this configuration where the application is on the output side of the S.O. is shown in FIG. 23. In this case, the wideband data modulator is shown in a block 60 being injected with the modulating signal on line 64. The filter 62 is an example of an application shown in FIG. 3 as 3d and supplies an input to an antenna on line 68.

An application combining a receiver and transmitter section: a transponder will comprise a S.O. receive and transmit section used to measure distance between an interrogator and a transponder. To measure distance, the number of wavelengths of the radio frequency signal between the interrogator and the transponder will be used as a "yardstick" or measurement tool. The wavelength is the distance a wave travels in the time required to complete one cycle. The wavelength of the signal is equal to the frequency of the signal in cycles per unit time divided by the speed of propagation in a distance traveled expressed in length units per unit time leaving wavelength with the dimensions of cycles per unit length. Since the frequency of the interrogator, the frequency of the transponder reply signal, and the speed of propagation are known values, the number of wavelengths needed to traverse the distance between the interrogator and the transponder is readily calculated. If the distance from the interrogator to the transponder and back to the interrogator is less than one wavelength, the distance is unambiguously calculated by comparing the time or phase shift of the transmit and receive signal in the interrogator. A transmitted signal 14 out of an interrogator travels a distance and is received by the transponder 10 by an antenna 28a as shown in FIG. 12(a). As the signal 14 propagates over an increased distance, the relative phase of the signal as compared to the signal originated in the interrogator increases. In the transponder 10 the signal captured by the antenna is injected on a line 28cb to the S.O. chain 2b. If the cascaded S.O. chain 2b simply amplifies the input signal on the line 28cb, then it will produce a signal on a line 28bd that represents the phase and frequency of the signal injected on the line 28cb. The signal on the line 28bd is input to an antenna 30a for transmission as the signal 12 back over the return distance from the transponder to the originating interrogator unit. The signal path from the transponder back to the originating interrogator will add an additional phase shift. The total phase shift as seen by the interrogator unit is the phase shift produced by the signal path from the interrogator to the transponder 10 plus the phase shift of the signal path from the transponder 10 back to the interrogator plus any phase shift introduced by the transponder. The distance or range between the interrogator and transponder is calculated by the observed phase shift of the receive signal phase relative to the transmit signal phase in the interrogator. The phase shift in the transponder 10 can be characterized and possibly discarded in the range calculation since this introduced phase shift may be a small portion of the total phase shift or not large enough to affect the accuracy of the range measurement. A phase shift is of course a time difference between two periodic signals measured between reference points on each signal and usually expressed in the angular displacement of degrees. Phase is a fraction of the period of a periodic waveform such as the wavelength of a signal. If only a phase measurement is made, and the distance between the interrogator and the transponder and back to the interrogator is longer than one wavelength, an ambiguity in the measurement exists as to how many additional wavelengths are present in the path between the interrogator and the transponder. Different frequencies have different wavelengths, so a different number of cycles between the interrogator and transponder will exist for a fixed distance for different frequencies. By using more than one known frequency of the signal in the system to determine the range, and by making a phase measurement at each frequency, the ambiguity can be resolved and a distance calculated. The two or more frequencies used must be chosen for a maximum range to be measured to ensure a non ambiguous measurement. The nature of removing phase ambiguities for range measurements is not the subject of the present invention so is not treated with any detail herein.

It should be mentioned that the above-described ranging application can be extended beyond the one-dimensional case to multi-dimensional cases. For example, two transponders can be interrogated by a single interrogator (or two interrogators and one transponder) to define a two dimensional plane. Or a single interrogator and a single transponder could be used if the two are in motion with respect to each other (i.e., the distance therebetween is changing). A point or multiple points in three-dimensional space can also be defined by extending the above-mentioned principle by using multiple devices. The position and orientation of a moving object may also be determined. For example, two stationary interrogators could be used to interrogate three transponders on the moving object or three interrogators on the moving object could interrogate two stationary transponders. The number of transponders/interrogators may be reduced if the motion of the object is taken into account by measuring Doppler effects.

Figure 31:
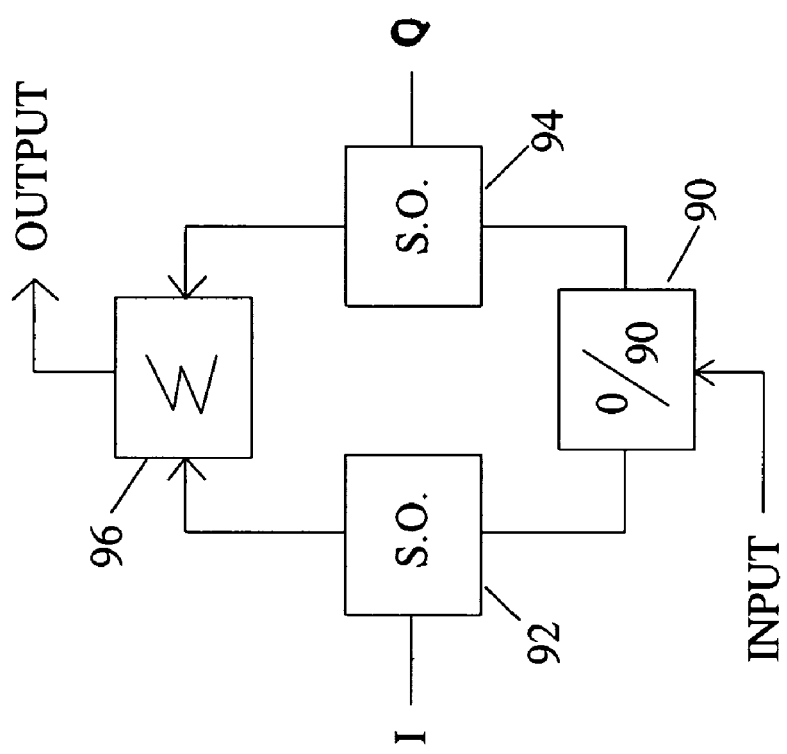
FIG. 31 shows an I-Q modulator, according to the present invention.

The invention is shown applied to a quadrature (IQ) modulator in FIG. 31. An IQ modulator controls both the amplitude and phase of a signal. It includes an input power divider called a quadrature divider 90 which divides the input signal (which might come from an antenna and/or an application) into two paths each having an amplitude and/or phase control element 92, 94, followed by a summer 96 which sums the outputs of the elements 92, 94 and provides an output signal (which might go to an antenna and/or an application). According to the present invention, synchronous oscillators are used for the elements 92, 94 instead of the typical components used in the prior art, i.e., PIN diode, Schottky diode or FET devices. The S.O.s 92, 94 of FIG. 31 may also be responsive to respective I and Q input signals as shown provided for example for mixing or control purposes, as the case may be. Any of the specialized S.O. circuits shown above with two inputs may be used for the S.O.s 92, 94, depending on the application. If the device is portable and supplied by a limited power supply, it may also employ a power control to the S.O.s 92, 94 such as the power controls shown in FIGS. 1–3.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

The invention claimed is:

1. Portable radio frequency device comprising a power supply and a power control for controlling power provided to said device during a limited period so as to consume a correspondingly limited amount of power from said power supply,
   a synchronous oscillator (1b) powered by said power supply during said limited period, said synchronous oscillator coupled to
   an application (1cd; 1c; 1d) and to
   an antenna (1a),
   said device for providing an output signal (2e; 3) for carrying out said application during said limited period in response to an input signal (2; 3e) received by said device and amplified by said synchronous oscillator during said limited period.

2. The device of claim 1, wherein said antenna (2a) is for capturing an incoming radio frequency input signal (2) for providing a captured signal (2ac) coupled to said synchronous oscillator (2b) via a first part (2c) of said application (2cd) and wherein said synchronous oscillator is responsive to said captured signal coupled thereto for providing an intermediate signal (2bd) to a second part (2d) of said application (2cd) for providing said output signal (2e).

3. The device of claim 2, wherein said first part (2c) of said application (2cd) is an electrical node and the captured signal (2ac) is provided directly to said synchronous oscillator (2b) without conditioning by any said application (2cd).

4. The device of claim 2, wherein said first part (2c) of said application (2cd) conditions said captured signal (2ac) for providing a conditioned signal (2cb) to said synchronous oscillator (2b).

5. The device of claim 4, wherein said synchronous oscillator (2b) further conditions said conditioned signal (2cb) for providing said intermediate signal as a further conditioned signal (2bd) to said second part (2d) of said application.

6. The device of claim 2, wherein said second part (2d) of said application (2d) conditions said intermediate signal (2bd) from said synchronous oscillator (2b).

7. The device of claim 2, wherein said second part (2d) of said application is an electrical node and the intermediate signal (2bd) provided from said synchronous oscillator (2b) is the same as said output signal (2e) from the second part (2d) of said application (2cd).

8. The device of claim 2, wherein said synchronous oscillator (2b) comprises a plurality of synchronous oscillators connected in a series of stages.

9. The device of claim 2, wherein said synchronous oscillator (2b) includes means for heterodyning two or more signals.

10. The device of claim 9, wherein at least one of said two or more signals is externally injected and said means for heterodyning includes means for heterodyning said at least one of said two or more signals with a signal provided locally to one or more synchronous oscillators.

11. The device of claim 2, wherein said synchronous oscillator comprises plural synchronous oscillators connected in a series of stages, each stage adding a gain factor which altogether provide a total gain for said incoming radio frequency signal lockable at a frequency in a bandwidth range equal to an input bandwidth range within which a frequency of said incoming radio frequency signal is received by said device.

12. The device of claim 2, wherein said incoming radio frequency signal has an input frequency within a designated input bandwidth range, wherein said synchronous oscillator comprises a plurality of synchronous oscillators connected in a series of amplifying stages, wherein said output signal is provided for transmission as an outgoing radio frequency signal at a frequency lockable within said designated input bandwidth range.

13. The device of claim 2, further comprising another antenna, responsive to said application output signal, for transmission as an outgoing radio frequency signal.

14. The device of claim 13, configured as a ranging device.

15. The device of claim 2, further comprising means responsive to said output signal (28da), for providing an outgoing radio frequency signal.

16. The device of claim 15, configured as a ranging device.

17. The device of claim 2, wherein said device is part of a quadrature modulator.

18. The device of claim 2, wherein said second part (2d6) comprises a detector for providing a voltage output.

19. The device of claim 2, wherein said second part (2d6) comprises a detector for providing an information signal output.

20. The device of claim 2, wherein said second part (2d5) of said application (2cd) comprises a detector and a switch control.

21. The device of claim 1, wherein said synchronous oscillator comprises a Colpitts oscillator.

22. The device of claim 1, further comprising:
a switch (1k, 2k, 3k, 36), responsive to a limited power supply (1f, 2f, 3f, Vcc) for providing power to said device in a closed position thereof; and
a switch control (1h, 2h, 3h, 38) for controlling said switch in said closed position for said providing power and in an open position for interrupting said power.

23. The device of claim 1, wherein a first application part (3c) of said application is responsive to said input signal (3e) for providing a conditioned signal (3cb), wherein said synchronous oscillator (3b) is responsive to said conditioned signal (3cb) for providing an intermediate signal (3bd), wherein a second part (3d) of said application is responsive to said intermediate signal for coupling said intermediate signal to said antenna (3a) for providing an outgoing radio frequency signal (3).

24. The device of claim 23, wherein said second part (3d) of said application is an electrical node and the intermediate signal (3bd) from the synchronous oscillator (3b) is provided directly to said antenna (3a) without conditioning by said second part (3d) of said application.

25. The device of claim 23, wherein said second part (3d) of said application conditions said intermediate signal (3bd) for providing a conditioned signal (3da) to said antenna (3a) which in turn provides said outgoing radio frequency signal (3) for transmission.

26. The device of claim 23, wherein said first part (3c) of said application is an electrical node and the conditioned signal (3cb) from the first part (3c) of the application is the same as the input signal (3e) and is provided directly to said synchronous oscillator (3b) without any conditioning by said first part (3c) of said application.

27. The device of claim 23, wherein said first part (3c) of the application conditions said input signal (3e) for providing said conditioned signal (3cb) to said synchronous oscillator (3b).

28. The device of claim 23, wherein said first part (3c) of said application originates said conditioned signal (3cb) to said synchronous oscillator (3b).

29. The device of claim 23, wherein said synchronous oscillator (3b) includes means for heterodyning two or more signals.

30. The device of claim 29, wherein at least one of said two or more signals is externally injected and said means for heterodyning includes means for heterodyning said at least one of said two or more signals with a signal provided locally to one or more synchronous oscillators.

31. The device of claim 23, wherein said synchronous oscillator (3b) comprises a plurality of synchronous oscillators connected in a series of stages.

32. The device of claim 31, wherein each stage adds a gain factor which altogether provide a total gain for said radio frequency signal lockable at a frequency in a bandwidth range equal to an input bandwidth range within which a frequency of said incoming radio frequency signal is received by said device.

33. The device of claim 23, wherein said incoming radio frequency signal has an input frequency within a designated input bandwidth range, wherein said synchronous oscillator comprises a plurality of synchronous oscillators connected in a series of amplifying stages, wherein a reply frequency of said outgoing radio frequency signal is lockable within said designated input bandwidth range.

34. The device of claim 23 configured as a transponder by also using said antenna for receiving or by the addition of a receive antenna.

35. The device of claim 23, wherein said first application part (3c5) is a pressure sensor circuit for providing said conditioned signal as a pressure signal (3cb) having a frequency indicative of sensed pressure.

36. The device of claim 23, wherein said device is part of a quadrature modulator.

37. The device of claim 1 further comprising another antenna coupled to said application.

38. A transponder comprising:
a first antenna (28a) responsive to an incoming radio frequency signal (14) for providing a captured radio frequency signal (28ac);
a first application part (28c) responsive to said captured signal, for providing a first coupled signal (28cb);
a synchronous oscillator, responsive to said first coupled signal, for providing a conditioned output signal (28bd);
a second application part (28d) responsive to said conditioned output signal, for providing a second coupled signal (28da); and
a second antenna (30a), responsive to said second coupled signal (28da), for providing an outgoing radio frequency signal (12).

39. The transponder of claim 38, wherein said device comprises a shared antenna instead of said first antenna and said second antenna as separate antennas.

40. The transponder of claim 38, configured as a ranging device.

41. A device, comprising:
a quadrature hybrid for providing a pair of quadrature signals in response to an input signal;
a pair of synchronous oscillators each responsive to a respective one of the quadrature signals for providing synchronous oscillator output signals; and
a summer, responsive to the output signals from the synchronous oscillators, for providing a summed output signal.

42. The device of claim 41, further comprising a power control for controlling power provided from a power supply to said device to a limited period.

43. The device of claim 41, further comprising at least one antenna coupled to said device.

44. The device of claim 43, wherein said device is a portable radio frequency device.

45. The device of claim 44, further comprising a power control for controlling power provided from a power supply to said device to a limited period.

* * * * *